(12) United States Patent
Plinke et al.

(10) Patent No.: US 11,006,586 B2
(45) Date of Patent: May 18, 2021

(54) ENERGY EFFICIENT GREENHOUSE

(71) Applicant: Ceres Greenhouse Solutions LLC, Boullder, CO (US)

(72) Inventors: Marc Plinke, Boulder, CO (US); Lindsey Schiller, Vienna, VA (US)

(*) Notice: Subject to any disclaimer, the term of this patent is extended or adjusted under 35 U.S.C. 154(b) by 0 days.

(21) Appl. No.: 16/328,278

(22) PCT Filed: Feb. 19, 2018

(86) PCT No.: PCT/US2018/018645
§ 371 (c)(1),
(2) Date: Feb. 25, 2019

(87) PCT Pub. No.: WO2018/152477
PCT Pub. Date: Aug. 23, 2019

(65) Prior Publication Data
US 2019/0373820 A1 Dec. 12, 2019

Related U.S. Application Data

(60) Provisional application No. 62/460,543, filed on Feb. 17, 2017.

(51) Int. Cl.
*A01G 9/24* (2006.01)
*A01G 9/14* (2006.01)

(52) U.S. Cl.
CPC ............ *A01G 9/246* (2013.01); *A01G 9/14* (2013.01); *A01G 9/243* (2013.01); *A01G 9/245* (2013.01)

(58) Field of Classification Search
CPC . A01G 9/14; A01G 9/24; A01G 9/243; A01G 9/245; A01G 9/246
See application file for complete search history.

(56) References Cited

U.S. PATENT DOCUMENTS

| | | | | |
|---|---|---|---|---|
| 4,291,674 A | * | 9/1981 | Comte | A01G 9/243 126/592 |
| 4,412,527 A | * | 11/1983 | Fujie | A01G 9/243 126/400 |
| 4,437,263 A | * | 3/1984 | Nir | A01G 9/243 47/1.01 R |

(Continued)

FOREIGN PATENT DOCUMENTS

| | | | | |
|---|---|---|---|---|
| FR | 2320693 A1 | * | 3/1977 | ............ A01G 9/243 |
| GB | 2182076 A | * | 5/1987 | ............ A01G 9/243 |

(Continued)

*Primary Examiner* — Lisa L Tsang

(57) ABSTRACT

A greenhouse, for cold weather climates, is configured with a gable that is offset toward the north wall and therefore the south extension of the roof, from the gable to the south wall is longer than the north extension. A greater amount of light can enter through this south extension and the inside surface of the north wall is configured with a reflective surface to allow light to be more uniformly distributed around the plants. The north wall may no widows and may be thermally insulated to prevent the greenhouse from getting too cold during the night. A ground to air heat transfer (GAHT) system may be configured to produce a flow of greenhouse air under the greenhouse for heat transfer, to moderate the temperature of the greenhouse. A thermal medium may flow to a thermal reservoir for heat exchange with the conduits of the GAHT system.

28 Claims, 19 Drawing Sheets

(56) References Cited

U.S. PATENT DOCUMENTS

| | | | |
|---|---|---|---|
| 4,699,316 A | | 10/1987 | Johnson |
| 4,979,331 A | * | 12/1990 | Tanaka .................. A01G 9/222 |
| | | | 47/17 |
| 5,261,184 A | | 11/1993 | Appeldom et al. |
| 5,813,168 A | * | 9/1998 | Clendening ............ A01G 9/246 |
| | | | 47/17 |
| 2004/0194371 A1 | | 10/2004 | Kinnis |
| 2007/0214714 A1 | | 9/2007 | Harnois et al. |
| 2007/0237738 A1 | * | 10/2007 | Hanzlicek ............... A61L 9/014 |
| | | | 424/76.2 |
| 2010/0126062 A1 | * | 5/2010 | Houweling ............ A01G 9/246 |
| | | | 47/17 |
| 2010/0313874 A1 | * | 12/2010 | Verey .................... F25B 27/005 |
| | | | 126/643 |
| 2011/0005151 A1 | * | 1/2011 | Krecke ............... F28D 20/0052 |
| | | | 52/173.1 |
| 2013/0032068 A1 | * | 2/2013 | Van Wesenbeeck ......................... A01G 9/1438 |
| | | | 111/118 |
| 2014/0377007 A1 | * | 12/2014 | Charles .................... B09C 1/08 |
| | | | 405/128.75 |
| 2015/0223407 A1 | * | 8/2015 | Carroll .................. A01G 9/243 |
| | | | 47/17 |
| 2015/0223409 A1 | * | 8/2015 | Abahusayn ............. A01G 9/14 |
| | | | 47/17 |
| 2017/0013789 A1 | * | 1/2017 | Bose ...................... A01G 9/243 |
| 2018/0263194 A1 | * | 9/2018 | Pilebro ................. A01G 9/243 |
| 2019/0289803 A1 | * | 9/2019 | Gagne ................... A01G 9/247 |

FOREIGN PATENT DOCUMENTS

| | | | |
|---|---|---|---|
| KR | 1020050078851 A | 8/2005 | |
| WO | WO-2010088632 A2 * | 8/2010 | ............. G02B 7/183 |

* cited by examiner

Sun Intensity Calculations per Location and Greenhouse Type

| Location | Sun intensity on Ground, [kWh/m2/day] Calgary, Alberta, Canada | Sun intensity on Ground in Conventional Greenhouse [kWh/m2/day] Calgary, Alberta, Canada | Example 1 Intensity on north wall, [kWh/m2/day] Calgary, Alberta, Canada | Example 1 Added intensity per sqft in the ground, [kWh/m2/day] Calgary, Alberta, Canada | Example 1 Total intensity in ground w/o Poly, [kWh/m2/day] Calgary, Alberta, Canada | Example 1 Greenhouse, [kWh/m2/day] Calgary, Alberta, Canada | Production Difference between ground and Example 1 Greenhouse Calgary, Alberta, Canada | Production Difference between Example 1 and conventional greenhouse Calgary, Alberta, Canada |
|---|---|---|---|---|---|---|---|---|
| Location1 | | | | | | | | |
| Jan | 1.3 | 1.1 | 3.9 | 2.7 | 4.1 | 3.2 | 246% | 308% |
| Feb | 2.3 | 1.8 | 4.2 | 2.9 | 5.2 | 4.1 | 182% | 227% |
| Mar | 3.6 | 2.9 | 4.3 | 3.0 | 6.6 | 5.3 | 148% | 185% |
| Apr | 4.7 | 3.8 | 3.8 | 2.6 | 7.3 | 5.9 | 124% | 155% |
| May | 5.8 | 4.6 | 3.3 | 2.3 | 8.1 | 6.5 | 112% | 140% |
| Jun | 6.3 | 5.0 | 3.2 | 2.2 | 8.5 | 6.8 | 108% | 135% |
| Jul | 6.7 | 5.4 | 3.6 | 2.5 | 9.2 | 7.4 | 110% | 137% |
| Aug | 5.4 | 4.3 | 3.9 | 2.7 | 8.1 | 6.5 | 120% | 150% |
| Sep | 3.9 | 3.1 | 4.1 | 2.9 | 6.7 | 5.4 | 139% | 174% |
| Oct | 2.7 | 2.2 | 4.7 | 3.2 | 6.0 | 4.8 | 175% | 219% |
| Nov | 1.5 | 1.2 | 3.4 | 2.4 | 3.9 | 3.1 | 206% | 258% |
| Dec | 1.1 | 0.8 | 2.9 | 2.0 | 3.1 | 2.5 | 233% | 292% |

FIG. 12

Sun Intensity Calculations per Location and Greenhouse Type

| Location | Sun intensity on Ground, kWh/m2/day | Sun intensity on Ground in Conventional Greenhouse kWh/m2/day | Example 1 Sun intensity on wall, kWh/m2/day | Example 1 Added inentisly per sqft in the ground, kWh/m2/day | Example 1 Total intensity in ground w/o Poly, kWh/m2/day | Example 1 Adjustment for Polycarbonate, kWh/m2/day | Production Difference between ground and Example 1 Greenhouse | Production Difference between Example 1 and conventional greenhouse |
|---|---|---|---|---|---|---|---|---|
| | Boulder 1 | Boulder 1 | Boulder 1 | Boulder 1 | Boulder 1 | Boulder 1 | Boulder 1 | Boulder 1 |
| Jan | 2.4 | 2.3 | 4.3 | 0.9 | 3.3 | 3.1 | 127% | 136% |
| Feb | 3.1 | 2.9 | 4.3 | 0.9 | 4.0 | 3.7 | 120% | 127% |
| Mar | 4.3 | 4.1 | 4.1 | 0.8 | 5.2 | 4.8 | 112% | 119% |
| Apr | 5.6 | 5.3 | 3.5 | 0.7 | 6.3 | 5.9 | 106% | 112% |
| May | 6.4 | 6.0 | 2.8 | 0.6 | 6.9 | 6.5 | 102% | 109% |
| Jun | 6.7 | 6.3 | 2.4 | 0.5 | 7.2 | 6.7 | 101% | 107% |
| Jul | 6.3 | 5.9 | 2.5 | 0.5 | 6.8 | 6.4 | 102% | 108% |
| Aug | 5.7 | 5.3 | 3.1 | 0.6 | 6.3 | 5.9 | 104% | 111% |
| Sep | 4.9 | 4.6 | 4.1 | 0.8 | 5.7 | 5.3 | 110% | 117% |
| Oct | 3.6 | 3.4 | 4.5 | 0.9 | 4.5 | 4.3 | 117% | 125% |
| Nov | 2.6 | 2.4 | 4.3 | 0.9 | 3.4 | 3.2 | 126% | 134% |
| Dec | 2.2 | 2.0 | 4.3 | 0.9 | 3.0 | 2.9 | 131% | 140% |

FIG. 14

Actual Energy Usage

| 04/21/17 Bill 543622016 | | -------------- | Total New Charges: | $3,165.39 |
|---|---|---|---|---|
| Natural Gas Service: | $70.68 | | Electricity Service: | $2,804.15 |
| Other Charges: | $0.00 | | Total Taxes/Fees: | $290.56 |
| Late Charges: | $0.00 | | Total Credits: | $0.00 |

| 04/06/17 Online Payment | | -------------- | Payment Amount: | -$6,427.93 |
|---|---|---|---|---|

| 03/23/17 Bill 539875844 | | -------------- | Total New Charges: | $3,251.13 |
|---|---|---|---|---|
| Natural Gas Service: | $87.09 | | Electricity Service: | $2,822.34 |
| Other Charges: | $0.00 | | Total Taxes/Fees: | $294.05 |
| Late Charges: | $47.65 | | Total Credits: | $0.00 |

| 02/23/17 Bill 536280061 | | -------------- | Total New Charges: | $3,176.80 |
|---|---|---|---|---|
| Natural Gas Service: | $102.28 | | Electricity Service: | $2,782.90 |
| Other Charges: | $0.00 | | Total Taxes/Fees: | $291.62 |
| Late Charges: | $0.00 | | Total Credits: | $0.00 |

| 01/25/17 Online Payment | | -------------- | Payment Amount: | -$10,405.03 |
|---|---|---|---|---|

| 01/24/17 Bill 532507631 | | -------------- | Total New Charges: | $3,453.30 |
|---|---|---|---|---|
| Natural Gas Service: | $126.36 | | Electricity Service: | $3,009.96 |
| Other Charges: | $0.00 | | Total Taxes/Fees: | $316.98 |
| Late Charges: | $0.00 | | Total Credits: | $0.00 |

FIG. 20

Energy Efficiency:
Commercial Building vs. Greenhouse

Commercial
Resource Use & Utility Cost

| | | |
|---|---|---|
| Annual Electricity | 1,138,141 kBTU | $21,514 |
| Annual Heat | 175,013 kBTU | $1,152 |
| Annual Water | 4,937 gal | $19 |
| Feed In Tariff Electricity | 0 kBTU | $0 |
| Feed In Tariff Heat | 0 $/MMBTU | $0 |
| Total Annual Utility Cost | | $22,686 |

Greenhouse
Resource Use & Utility Cost

| | | |
|---|---|---|
| Annual Electricity | 499,017 kBTU | $9,433 |
| Annual Heat | 191,019 kBTU | $1,258 |
| Annual Water | 0 gal | $0 |
| Feed In Tariff Electricity | 0 kBTU | $0 |
| Feed In Tariff Heat | 0 $/MMBTU | $0 |
| Total Annual Utility Cost | | $10,691 |

FIG. 21

ENERGY EFFICIENT GREENHOUSE

CROSS REFERENCE TO RELATED APPLICATIONS

The application claims the benefit of priority to U.S. provisional patent application No. 62/460,543, filed on Feb. 17, 2017 and entitled Greenhouse With Offset Gable; the entirety of which is hereby incorporated by reference herein.

BACKGROUND OF THE INVENTION

Field of the Invention

The invention relates greenhouses and particularly to greenhouse configured for cold weather climates and particularly high latitude regions or high elevation areas.

Background

Greenhouses provide improved growing environments for plants and enable plants to be grown in cold weather climates. In some locations, there are large temperature fluctuations throughout the day and this can be problematic. For example, high elevation areas, especially those nearer the equator can have very large temperature swings throughout a day, such as 10° C., 20° C. or even 40° C. or more. The temperature difference between the inside of the greenhouse and the outside temperature can be as high as 30° C. or more. This makes growing plant in a greenhouse difficult. In these locations, the interior or the greenhouse may become too hot during the day and then too cold during the night, stressing the plants and reducing their growth or killing the plants. There exists a need for a greenhouse that is specifically designed for growing plants in these more difficult regions.

SUMMARY OF THE INVENTION

The invention is directed to a greenhouse and particularly to greenhouses configured for cold weather climates and to methods of growing plants in said greenhouses. An exemplary greenhouse of the present invention provides an increased light intensity within the greenhouse and therefore high production of plant growth. The exemplary greenhouse achieves this increased light intensity through design and orientation of the greenhouse. In addition, an exemplary greenhouse comprises a ground to air heat transfer (GAHT) system that efficiently moderates the temperature within the greenhouse. An exemplary greenhouse of the present invention enables efficient plant production in higher latitude regions and in high altitude locations.

An exemplary greenhouse comprises an enclosure having an offset gable between a south wall and north wall. The inside surface of the north wall may comprise a light reflective surface so that sunlight entering from the south wall and the south extension of the roof, the roof portion between the gable and the south wall, will reflect into the greenhouse enclosure. The south wall may comprise a plurality of south wall windows to allow and the south extension of the roof may comprise south extension windows to allow a large amount of light into the greenhouse. The south wall and/or the south extension of the roof may consist substantially of windows, wherein at least about may 75% of the area is made up of windows, and preferably at least about 85%. The north wall may be opaque and may have less than 25% surface area that is windows and preferably less than about 10% and even more preferably, substantially windowless, or have less than a 10% surface area made up of windows. The north wall may be insulated to keep heat generated during the day from escaping and to thermally insulate the interior of the greenhouse from the cold temperatures at night. The north extension may also be substantially windowless and have less than a 10% surface area that is made of windows and preferably have no windows and be insulated, for the reasons provided herein.

The greenhouse also comprises an east and west wall and these walls may comprise a door and/or one or more windows. The surface area of coverage of windows on the east and west walls may be dependent on the location and the temperature ranges. A greenhouse in a very cold climate may have less windows on the east and west walls to maintain temperature throughout the night than a greenhouse in a more moderate climate. In cold climates, the east and west walls may have a window area of up to about 40% or even 50% and in more moderate climates the east and west window areas may be up to about 75% or even 85%. In the colder climates, the east and west walls may have less window area and therefore may provide more thermal insulation and may also have an interior that comprises a reflective surface, especially proximal the north wall.

The gable of the greenhouse may be offset toward the north wall, wherein the south extension of the roof is longer than the north extension of the roof. The gable may be substantially over the north wall, whereby there is no north extension of the roof. The offset gable at least 20% closer to the north wall than the south wall, or at least 50% or even 80% closer, as determined by horizontal distances from the gable to the north wall versus the south wall. The offset gable provides more south facing roof area and this south facing roof area may have a high percentage of windows, or greater than 50%. The gable may be offset, wherein the ratio of the distance from the gable to the north wall over the distance from the gable to the south wall, as measured normal to the height of the greenhouse, is at no more than ¾, no more than ⅔, no more than ½, no more than ⅓, no more than ¼, zero and any range between and including the offset ratios provided. The south extension length will be longer than the north extension length when the gable is offset toward the north wall. The south extension may be about 1.5 times or more longer than the north extension, about 2.0 times or more longer than the north extension, about 3.0 times or more longer than the north extension, about 5.0 times or more longer than the north extension and any range between and including the ratio of south to north extension lengths. It may be beneficial to have a much longer south extension than north extension to increase the light entering the greenhouse. The south rise angle, the angle of the south extension to the gable, will be less than the north rise angle, the angle of the north extension to the gable, since the north extension is shorter with an offset gable and therefore requires a steeper angle to the gable from the north wall. The gable angle is the angle from the south extension to the north extension as measured about the gable.

The south extension comprises light transmission materials or windows that may be configured over a majority of the area of the south extension. The south extension may be substantially windows, or light translucent materials, such as at least 75% of the south extension surface area, or at least 85% of the south extension area, or at least 90 or 95% of the south extension area. The south extension area or surface area is the product of the length and width of the south extension. An exemplary south extension may comprise high light transmission materials, such as glass, or polycarbonate however, polycarbonate is susceptible to ultraviolet (UV) light degradation and coatings are often applied to reduce this degradation. Unfortunately, this coating reduces the UV light transmission, which is desired in a greenhouse. Therefore, other materials may be preferred, such as Acrylic, Ethylene Tetrafluoroethylene (ETFE), and Poly film that allow more of the full spectrum of light to pass therethrough. Ideally a light transmission material with allow at least 80% of photo active radiation (PAR) light to pass through and more preferred is 90% or more of PAR. A full spectrum light transmission material may be desired, such as down to 200 nm. It is important to have light transmission of light down to at least 380 nm, as this is photo active light. Lower wavelength light is good in greenhouse applications as insects do not like these lower wavelengths and will be deterred from entering the greenhouse.

The windows of the greenhouse, including those on the south extension, and/or south wall may transmit Power Light, or light within a wavelength spectrum that is absorbed readily by plants. This light may appear pink in color, as the green wavelengths of light are reduced and/or removed from the transmitted light. Likewise, the interior of the greenhouse may comprise materials that reflect or transmit Power Light, and may comprise a coating or additive to change the wavelength range absorbed by vegetation, for example. Furthermore, Power Light reflectors may be configured strategically within a greenhouse to increase the amount of Power Light and may be configured around the plants, such as between rows of plants. A Power Light reflector may be a translucent material and/or reflective material. In an exemplary embodiment, a Power Light reflector is translucent and certain wavelengths of light are absorbed by the Power Light reflector and Power Light is transmitted therethrough. Power Light reflectors may be configured along the north wall or coupled to the north wall or to a movable reflective sheet configured along the north wall. Power Light reflectors may be configured along the east and west walls, and may also be configured along the south wall, and/or along the south extension.

The greenhouse may be oriented with the south wall facing substantially south, or within about 15 degrees of south. The greenhouse may be oriented with the gable length extending east/west, or within about 15 degrees of east west. The south extension may extend from the south wall substantially north to the gable. Plants may be configured within the greenhouse and light entering from the south wall and/or the south extension may reflect off of the inside reflective surface of the north wall and provide a more complete diffuse exposure of sun to the plants. This may prevent the need for rotating the plants to ensure a more uniform and full growth, which can be labor intensive and difficult to track.

The north wall and/or the north extension, as well as portions of the east and west walls may comprise a light reflective surface, such as a paint having reflective properties or a coating having reflective materials, a film or sheet of material attached to or configured over the north wall. In an exemplary embodiment, a sheet of material is configured to move to expose more or less of the reflective film over the north wall. A reflective material, a film, coating, paint, or sheet, may be a diffuse reflective material, a spectral reflective and may also allow some portion of the light or heat to pass therethrough. An exemplary reflective material may have a light reflective value (LRV) of about 50% or more, about 75% or more, about 85% or more or about 95% or more and the selection may depend on the location of the greenhouse and environmental conditions. For example, a greenhouse located in northern latitude where the temperature drops a lot during the night may require a reflective material with an LRV of no more than about 75% to allow energy to pass through to heat the phase change material. A diffuse reflective material may be preferred as may provide for a more uniform and distributed light that more effectively promotes plant growth. An exemplary diffuse reflective material, such as a paint, may comprise diffuse reflective components, including but not limited to ceramic particles, titanium dioxide ($TiO_2$) polymeric particles, polymeric material, porous spherical particles and the like. An exemplary reflective sheet, such as an Orca Grow Film, available from Orca Films LLC, is a diffuse reflective material. A reflective sheet may be configured along the north wall and may be configured to move up and down or across the north wall to change the amount of reflectance area along the north wall. In an exemplary embodiment, a reflective sheet is configured in a roll extending along the top of the north wall and an actuator is configured to unroll the reflective sheet down along the north wall to increase the light within the greenhouse. A reflective sheet may comprise a diffuse reflective material and may also comprise a Power Light reflector so that a diffuse Power Light is reflected from the north wall into the greenhouse.

The north wall and/or the north extension, as well as portions of the east, west and south walls may be thermally insulated to prevent heat loss at night to maintain the greenhouse within desired temperature ranges. A thermally insulated wall or roof extension comprises some form of thermal insulation material that increase has an RSI per meter of at least about 1.25 and preferably 3.0 or more, and even more preferably about 10.0 or more, and any range between and including the RSI per meter provided. The north wall, north extension, east and west wall may comprise a thermal sink material, such as a ceramic material that absorbs heat energy during the day and releases this stored heat energy at night. For example, the north wall may comprise brick, or cement board for this purpose.

Any windows on the east and west walls may be configured proximal to the south wall, wherein the east and west wall window depths, the distance from the south wall to the furthest end of window on that wall, is no more than about 60% of the total wall depth, and may be no more than about 50% of the total depth, or no more than about 25% of the total depth.

An exemplary greenhouse has a length, which extends substantially east/west, of at least 6 m and a depth of at least 3 m. The length may be about 10 m or more, about 20 m or more, about 40 m or more, about 60 m or more and any range between and including the lengths provided. Likewise, the depth, which extends substantially north/south may be about 6 m or more, about 10 m or more, about 15 m or more and any range between and including the values provided. The length to width ratio may be about 1.5 to 1, to about 3 to 1 or even to about 7 to 1. The height of the south wall may be about 2.5 m or more, about 3 m or more and when tall crops are grown, such as hops, the height of the south wall may be about 6 m or more, and may be any range between and including the heights provided, or from about 2 m to about 8 m. The height of the north wall may be 4 m or more, 5 m or more, 6 m or more or from about 3.5 m to about 8 m. In an exemplary embodiment, the north wall has a height greater than the south wall, such as at least 1.25 greater or more, or about 1.5 greater or more, about 1.75 greater to more, about 2.0 greater or more, about 2.5 greater or more and any range between and including the height ratios provided. Because the north wall is taller than the south wall, the south wall windows may be opened along with the windows along the top of the north wall to create a chimney effect, to draw air in through the south windows and out through the north wall windows. The angle the roof may be about 1/12 or more, about 2/12 or more, about 3/12 or as much as 4/12 and will depend on the latitude wherein a more northern latitude may have a steeper roof angle to capture more light and a more southern latitude may have a flatter, or less steep roof.

An exemplary greenhouse may have a headhouse that extends along the north wall. The design and orientation of the greenhouse of the present invention enables a headhouse to be coupled to the greenhouse without interfering with light entering the greenhouse. Conventional greenhouse and their orientation do not provide a feasible headhouse location. An exemplary headhouse may have a roof that is lower than the height of the north wall, creating a sawtooth roofline. An exemplary headhouse may extend the entire length of the greenhouse and have a doorway on the east or west ends of the headhouse. An exemplary headhouse may be 3 m wide or more, about 5 m wide or more or as much as 6 m wide or more and may be used to store water, may be a cool room for working, may include an office or bathroom and the like. A headhouse may provide additional thermal insulation to the north wall, which may be important in higher latitudes wherein the nighttime and winter temperatures may be very low.

An exemplary greenhouse, as described herein, may be configured with a turntable, wherein the greenhouse can be spun to change the orientation of the greenhouse with respect to south. In the winter months, the south facing wall, as described herein may face south to allow a large amount of light into the greenhouse to warm the greenhouse and prevent the interior from getting too cold, or below a lower threshold, during the night. This same orientation during the summer months may provide too much light and the temperature inside the greenhouse may get too high, or above an upper threshold for the plants. To prevent this, the greenhouse may be rotated in the summer, whereby the north wall now faces substantially south, within about 15 degrees of south, and the south wall therefore faces north. This orientation would allow much less light Into the greenhouse and may be ideal for summer months when the sun is close to being directly overhead. A turntable may be support that rotates about a pivot and may comprise bearings and a drive motor to enable rotation of the greenhouse.

The north wall of an exemplary greenhouse, may comprise a phase change material that absorbs heat during the daylight hours and then emits heat into the greenhouse during the night to moderate the temperature of the greenhouse. Phase change materials are available with melting temperatures ranging from −5° C. up to 190° C. and many within the lower and upper threshold limits of most greenhouses. Phase change materials can store five to fourteen times more heat per unit volume than conventional storage materials such as water, masonry or rock. For this reason, phase change materials are preferred as a heat sink in the present invention. In an exemplary embodiment, a phase change material may have a melting temperature that is within the desired greenhouse temperature range or between the upper and lower threshold limits. This enables the phase change material to melt during the daylight hours to store heat and then release this heat as the greenhouse temperature drops at night.

Any suitable type of phase change material may be used including, but not limited to salt hydrates, fatty acids and esters, and various paraffins (such as octadecane) and ionic liquids. Most organic solutions type phase change materials are water-free, and can therefore be exposed to air. However, salt-based phase change materials must be sealed in an enclosure to prevent water evaporation or uptake. Suitable phase change materials are available from Climator Sweden AB, Entropy Solution LLC and PureTemp Inc., of Plymouth Minn., Pluss Advanced Technologies Ltd of India and RGEES LLC, Candler, N.C. An exemplary phase change material is PCM-HS22P from RGEES LLC, an inorganic hydrated salt mixture having a melting temperature of 23° C., liquid density of 1540 kg/m, solid density of 1840 kg/m³, latent heat of 185 kJ/kg, and specific heat-liquid 0.73 kcal/kg·K).

Table 1 provides a list of some other exemplary types of phase change materials.

TABLE 1

| Material | Melting point ° C. | Heat of fusion kJ · kg$^{-1}$ |
|---|---|---|
| Paraffin 14-Carbons [35] | 5.5 | 228 |
| Paraffin 15-Carbons [35] | 10 | 205 |
| Paraffin 16-Carbons [35] | 16.7 | 237.1 |
| Formic acid [35] | 7.8 | 247 |
| Caprilic acid [35] | 16.3 | 149 |
| Glycerin [35] | 17.9 | 198.7 |
| p-Lattic acid [35] | 26 | 184 |
| Methyl palmitate [35] | 29 | 205 |
| Camphenilone [35] | 39 | 205 |
| Docasyl bromide [35] | 40 | 201 |
| Caprylone [35] | 40 | 259 |
| Phenol [35] | 41 | 120 |
| Heptadecanone [35] | 41 | 201 |
| 1-Cyclohexylooctadecane [35] | 41 | 218 |
| 4-Heptadacanone [35] | 41 | 197 |
| p-Joluidine [35] | 43.3 | 167 |
| Cyanamide [35] | 44 | 209 |
| Methyl eicosanate [35] | 45 | 230 |
| 3-Heptadecanone [35] | 48 | 218 |
| 2-Heptadecanone [35] | 48 | 218 |
| Hydrocinnamic acid [35] | 48 | 118 |
| Cetyl acid [35] | 49.3 | 141 |
| α-Nepthylamine [35] | 59 | 93 |
| Camphene [35] | 50 | 238 |
| O-Nitroaniline [35] | 50 | 93 |
| 9-Heptadecanone (351 | 51 | 213 |
| Thymol [35] | 51.5 | 115 |
| Methyl behenate [35] | 52 | 234 |
| Diphenyl amine [35] | 52.9 | 107 |
| p-Dichlorobenzene [35] | 53.1 | 121 |
| Oxolate [35] | 54.3 | 178 |
| Hypophosphoric acid [35] | 55 | 213 |
| O-Xylene dichloride [35] | 55 | 121 |
| β-Chloroacetic acid [35] | 56 | 147 |
| Chloroacetic acid [35] | 56 | 130 |
| Nitro napthalene [35] | 56.7 | 103 |
| Trimyristin [35] | 33 | 201 |
| Acetic acid [35] | 16.7 | 184 |
| Polyethylene glycol 600 [35] | 20 | 146 |
| Capric acid [35] | 36 | 152 |
| Eladic acid [35] | 47 | 218 |
| Pentadecanoic acid [35] | 52.5 | 178 |
| Tristearin [35] i | 56 | 191 |
| Myristic acid [35] | 58 | 199 |
| Palmatic acid [35] | 55 | 163 |

An exemplary greenhouse may comprise an odor reducing material such as titanium dioxide. An odor reducing material may react with volatile organic compounds (VOCs) by reaction and sometimes the reaction is promoted by heat or light exposure. An exemplary odor reducing compound may be configured in a reflective material, such as a paint, coating, film or sheet.

An exemplary greenhouse of the present invention may comprise a Ground to Air Heat Transfer (GAHT™) system that regulates temperatures within the greenhouse through air manifolds configured in the ground. GAHT is a registered trademark of Ceres Greenhouse Solutions. During the day, the fan draws hot air from the greenhouse through a manifold of pipes buried underground. This cools the greenhouse, and simultaneously heats the soil, or the heat reservoir. When the greenhouse needs heating during cold periods, the GAHT™ system draws heat back up from the soil, creating warm air to heat the greenhouse. In other words, a GAHT system stores the heat from the greenhouse in the soil underground. The soil acts as thermal mass or heat reservoir, helping regulate the air temperature of the greenhouse. An exemplary GAHT system provides energy-efficient climate control by using the mass of soil underground. Often called a ground to air heat exchanger or climate battery, GAHT™ systems serve four critical functions.

An exemplary GAHT system moves air into and/or out of the greenhouse enclosure. The air moving device may circulate greenhouse gas through the GAHT system to regulate the temperature in the greenhouse. The airflow rate may be high enough to exchange the air within the greenhouse at a rate of about 0.25 times/hour or more, about 0.5 times/hour or more, about 0.75 times/hour or more, about 1.0 times/hour or more, about 2.0 times/hour or more, about 4 times/hour or more and any range between and including the exchange rates listed. Since the greenhouse temperature is regulated by circulation of greenhouse gas through the GAHT system, less outside air is required. Less exchanges of greenhouse gas with outside air is required and therefore the greenhouse can be more energy efficient, especially when the outside air is cold. The exchange rates of greenhouse gas with outside air may be no more than about 4 times/hour or less, no more than about 2 times/hour or less, no more than 1 time/hour or less, or as low as 0.5 time/hour or less.

An exemplary GAHT system is used to regulate temperatures and humidity levels within a greenhouse. The GAHT system may provide cooling during the day when the temperature within the greenhouse reaches about 70° F. to 80° F. or about 21° C. to about 27° C. A GAHT system may be used to heat the greenhouse, such as during the night, when the temperature drops to below about 50° F. to 60° F., or about 10° C. to 17° C. The GAHT may be turned off when the temperature of the soil or thermal reservoir of the GAHT system is at a similar temperature or within a temperature delta of each other.

An exemplary GAHT system comprises a thermal mass, or heat reservoir, that transfers heat to and from the air manifold(s) of the GAHT system to regulate the temperature within the greenhouse. A thermal mass may simply be the soil or ground or may comprise additional thermal sink components, such as more thermally conductive materials or materials with high heat capacities, including but not limited to metal, stone, water and the like. In an exemplary embodiment, a thermal mass comprises one or more thermal reservoirs, an enclosure for a thermal transfer material, such as a container of water. One or more barrels or enclosures may be configured under the greenhouse and may contain water or other types of thermal mass materials, as described herein. In an exemplary embodiment, a thermal reservoir is actively heated or cooled by GAHT conduits than are configured around or near the thermal reservoir to enable thermal transfer between the thermal reservoir and the GAHT conduits.

An exemplary GAHT system may comprise a thermal medium heat transfer system. An exemplary thermal medium heat transfer system is a hydronic heat transfer system that utilizes a liquid heat-transfer medium, such as water, to heat the thermal mass or reservoir used in the GAHT system. For example, a hydronic conduit may supply a flow of water to a heat reservoir and transfer heat to the heat reservoir. The flow of hydronic fluid may be to a thermal reservoir or thermal mass to change the temperature of the thermal reservoir or thermal mass and this thermal reservoir may be in thermal communication with the heat reservoir. For example, a hydronic conduit may provide a flow of warm or cold water to the soil to change the temperature of the soil or thermal mass. The GAHT manifold may then be used to moderate or change the temperature of the air flowing therethrough, and thereby moderate the temperature of the greenhouse. In an exemplary embodiment, a hydronic conduit may extend around a thermal reservoir, such as an enclosure of water configured in thermal communication with the GAHT manifold. In another embodiment, a hydronic conduit provides a flow of a hydronic fluid, such as water, to a thermal reservoir or enclosure. A hydronic conduit may fill an enclosure with warm water during the day and this hot water in the thermal reservoir may be used to heat air flowing through GAHT manifold at night to keep the temperature in the greenhouse above a lower threshold value. A thermal reservoir may have an inlet and an outlet. The inlet may receive heated or cooled hydronic fluid and the outlet may expel hydronic fluid. A hydronic fluid may be heated by a conventional hot water heater or other types of heaters for fluids. A hydronic fluid may also be heated by heat transfer from waste heat, such as from solar panels, or from compost and the like. A hydronic fluid heated by free or waste heat may provide for a more efficient greenhouse system.

In an exemplary embodiment, a greenhouse of the present invention comprises photovoltaic panels to generate electricity and this electricity may be used to power systems of the greenhouse, such as lights, the GAHT system and the like. The photovoltaic panels may be located on the roof of the greenhouse, as the south extension faces south and provides for good exposure to sunlight. The photovoltaic panels may be configured along the south extension and proximal to the gable, along the uppermost portion of the south extension, or may be configured north of the gable. As described herein, the photovoltaic panels may be cooled by a flow of hydronic fluid, such as water. A wind power generator may be configured to provide power to the greenhouse as well and may be coupled to the greenhouse. An energy harvest greenhouse utilizes renewable energy to produce the required power for the greenhouse. For example, the photovoltaic panels may produce power during the day and a wind power generator may produce power at night for the light and the GAHT system.

An exemplary greenhouse may comprise additional heat management devices and systems, such as radiators configured within the greenhouse to cool the greenhouse. Radiators may be configured along the north wall, and a flow of fluid therethrough, such as a hydronic fluid may pull heat from the greenhouse during the heat of the day and this fluid may be stored and used later to heat the greenhouse at night and may flow back through the radiators or may be provided to the thermal mass or reservoir of the GAHT system.

In an exemplary embodiment, a greenhouse of the present invention is a closed greenhouse wherein there is only a small amount or no airflow out of the greenhouse. This may help to reduce water usage and to reduce odors such as when growing plants that produce a smell, such as *Cannabis*. A greenhouse with little to no air exchange with the outside poses some unique challenges, especially considering the immense temperature changes that can be brought on by varying sun intensity. An exemplary greenhouse achieves this by reducing the glazing to just the amount needed for plant growth during the hotter summer months and through the GAHT system and in some cases the use of phase change material (PCM). In addition, the construction of the greenhouse may have a reduced number of seams between different materials. The seams may be sealed by using at least double gaskets. As a result, an exemplary greenhouse has natural air exchanges that are as low as 1 AC/hr or less, or preferably 0.5 AC/hr or less. Standard greenhouses in comparison are in the range of 3 AC/hr and more.

An exemplary GAHT system may be used to pre-cool or pre-heat the incoming vent air which may be used to prevent or reduce mold. The greenhouse can be set under slight positive pressure to reduce any exchange with outside air. This will prevent disease and decrease CO2 usage. A pressurized GAHT™ system will also reduce radon buildup in the greenhouse.

An exemplary greenhouse may utilize translucent solar panel roofing materials. An exemplary translucent solar or photovoltaic material is available from. Soliculture Inc, Scotts Valley, Calif. A translucent photovoltaic panel may produce Power Light, as described herein.

An exemplary greenhouse may utilize actuating insulation materials that can roll up/roll down as required. For example, at night, the actuating insulation material may be rolled out, such as along the roof or ceiling and may reduce the heat loss from the greenhouse. The insulation material may be light transmitting and/or may comprise a reflective surface that produce Power Light, and or diffuse light. An exemplary actuating insulation material expands when deployed to increase the thermal insulation properties and may comprise a pleated configuration that increase in thickness from a compressed folded state by at least about two times or more, or about five times or more, or about ten times or more. The actuating insulation material may be two to three millimeters thick when rolled up or folded and then five centimeters thick when expanded.

The summary of the invention is provided as a general introduction to some of the embodiments of the invention, and is not intended to be limiting. Additional example embodiments including variations and alternative configurations of the invention are provided herein.

BRIEF DESCRIPTION OF THE DRAWINGS

The accompanying drawings are included to provide a further understanding of the invention and are incorporated in and constitute a part of this specification, illustrate embodiments of the invention, and together with the description serve to explain the principles of the invention.

FIG. 12 shows a table of data comparing the light intensity of the exemplary greenhouse of Example 1, to the light intensity on the ground and in a conventional greenhouse as a function of the month of the year and located in Calgary, Alberta.

FIG. 14 shows a table of data comparing the light intensity of the exemplary greenhouse of Example 1, to the light intensity on the ground and in a conventional greenhouse as a function of the month of the year and located in Boulder, Colo.

FIG. 20 shows a table of the energy usage of an exemplary greenhouse located in Colorado.

FIG. 21 shows a table comparing the energy usage of an exemplary greenhouse and a commercial building.

DETAILED DESCRIPTION OF THE ILLUSTRATED EMBODIMENTS

Figure 1:
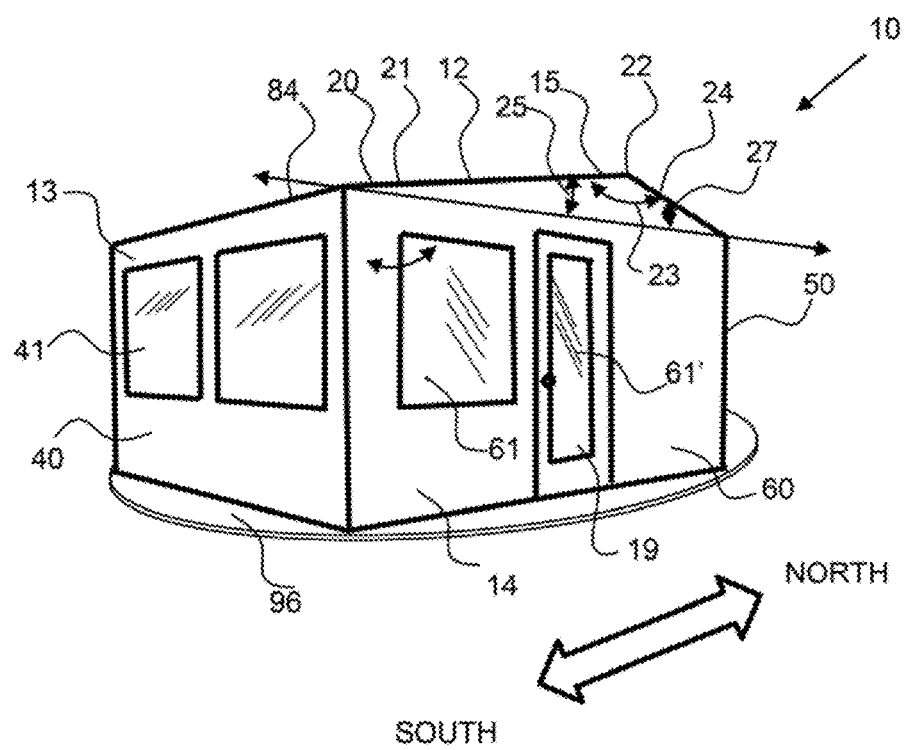
FIG. 1 shows a perspective view of an exemplary greenhouse having an offset gable between the north extension and south extension of the roof.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

In cases where the present specification and a document incorporated by reference include conflicting and/or inconsistent disclosure, the present specification shall control.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications and improvements are within the scope of the present invention.

Definitions

Windows, as used herein, is a light transmission material and may comprise glass panes, double wall and inert gas filed glass panes, hard and soft polymer sheets, such as polycarbonate and the like.

A wall or a north or south extension of an exemplary greenhouse consisting essentially of windows has a surface area that is at least 90% windows and comprises windows and may comprise supports configured between the windows that have a width that are no more than 10% of the width of the window and preferably not more than 5% of the width of the windows.

Power Light, as used herein, is light that has a portion of the wavelengths removed and preferably is a wavelength spectrum(s) that is easily absorbed by plants and is conducive to plant growth and health.

A gable, as defined herein, is the support for the south extension and may be the top of the north wall or may be offset from the north wall. An offset gable is configured closer to the north wall than the south wall, as described herein.

A diffusive reflective surface, as used herein, is a reflective surface that reflects light across a span of at least 130 degrees and preferably at least 150 degrees.

A heat reservoir, as used herein, is a reservoir for thermal heat transfer with the GAHT system and particularly with the heat exchange manifold. A heat reservoir may transfer or receive heat with the GAHT system. A heat reservoir may be configured under the greenhouse and may comprise soil, stone, gravel, thermally conductive additives such as metal, water, a thermal reservoir that receives a thermal medium and the like.

A thermal reservoir, as used herein is configured to receive a thermal medium and is configured to exchange heat with the GAHT system.

As shown in FIG. 1, an exemplary greenhouse 10 has an offset gable 22 between the north extension 24 and south extension 20 of the roof 12, or an offset gable roof 15. The gable is offset toward the north wall 50 of the greenhouse enclosure 13. The south extension 20 is longer and has a lower south rise angle 25 than the shorter north extension 24 having a higher or larger north rise angle 27. The angle between the south extension and the north extension, or the gable angle 23 is greater than 90 degrees in this embodiment. The south and north rise angles are measured from a horizontal line or a line connecting the intersection of the south extension interface with the south wall 40 and the north extension interface with the north wall 50, respectively. The south wall 50 has a plurality of south wall windows 41. The south wall windows may be configured over a majority of the south wall, or make up at least 50% of the south wall surface area. The east wall 60 has a south wall window 61 and a door 19. The door has a window as well, which is an east wall window, as it lets light in through the east wall. The east wall windows 41 are configured more proximal to the south wall than the north wall. The portion of the east wall proximal to the north wall may be thermally insulated and may comprise a light reflective surface, or an actuator for a reflective sheet on the inside surface of the east wall. The same may be true for the west wall. The roof has roof windows 84, or south extension windows 21 to allow sunlight to pass through the south extension of the roof. The north extension does not have any windows. Also shown in FIG. 1 is a turntable 96, a rotation feature to allow the greenhouse to be rotated depending on the time of year, as described herein. The greenhouse is support by the turntable and could be rotated manually or with the aid of a motor.

Figure 2:
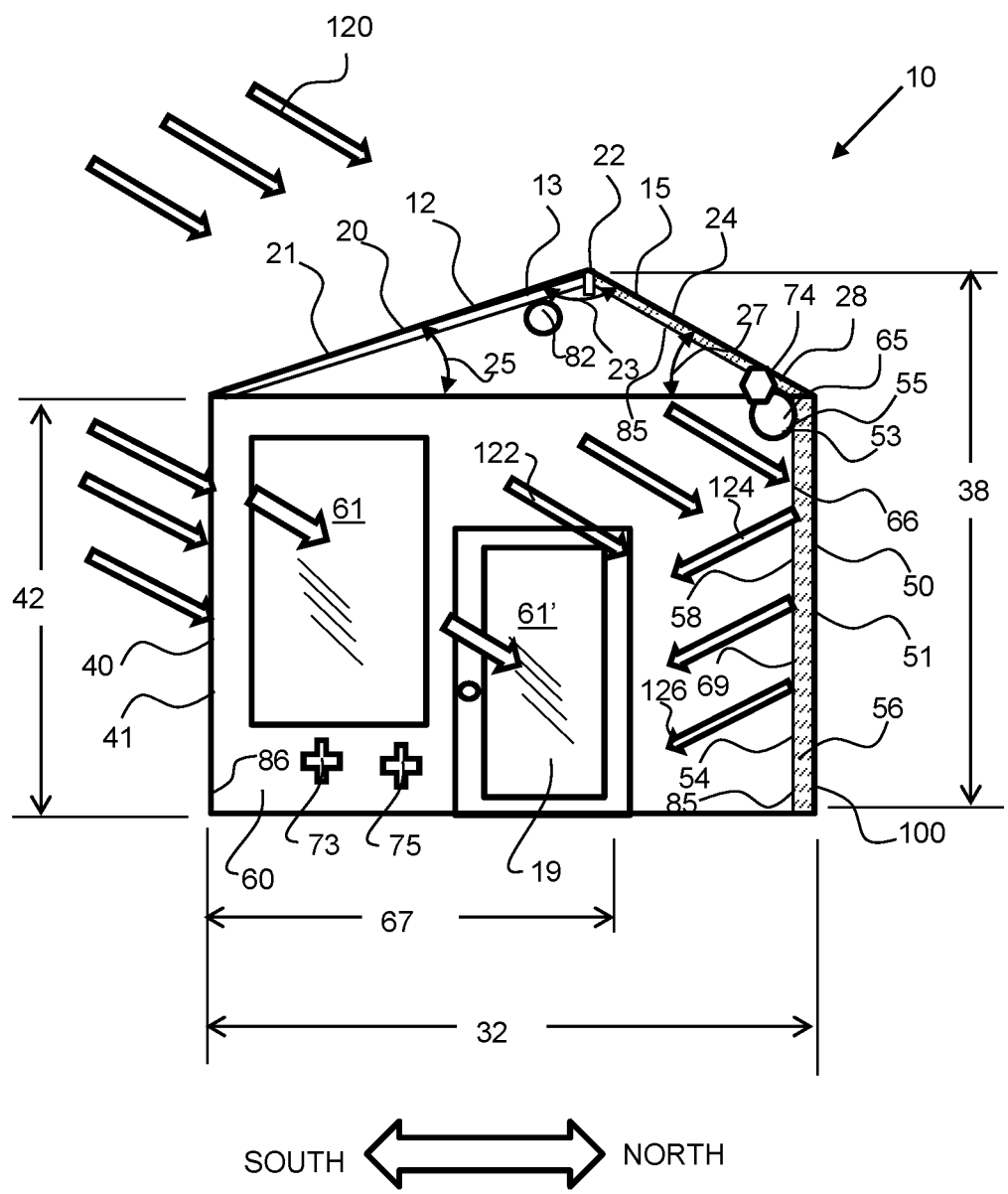
FIG. 2 shows an east wall view of an exemplary greenhouse having an offset gable roof.
Figure 3:
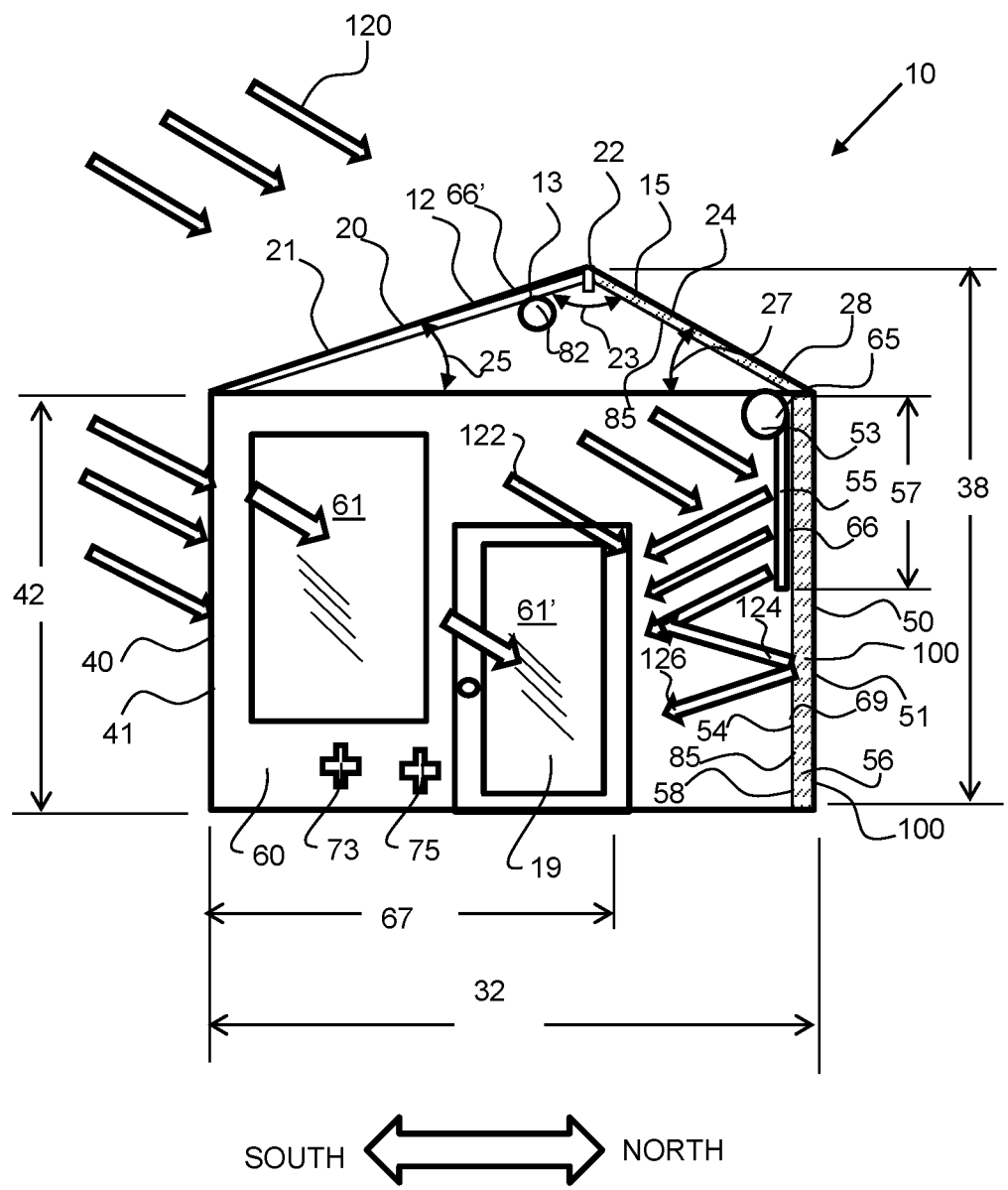
FIG. 3 shows an east wall view of an exemplary greenhouse having an offset gable roof and a reflective sheet actuator for controlling a reflective sheet depth along the interior of the north wall.
Figure 4:
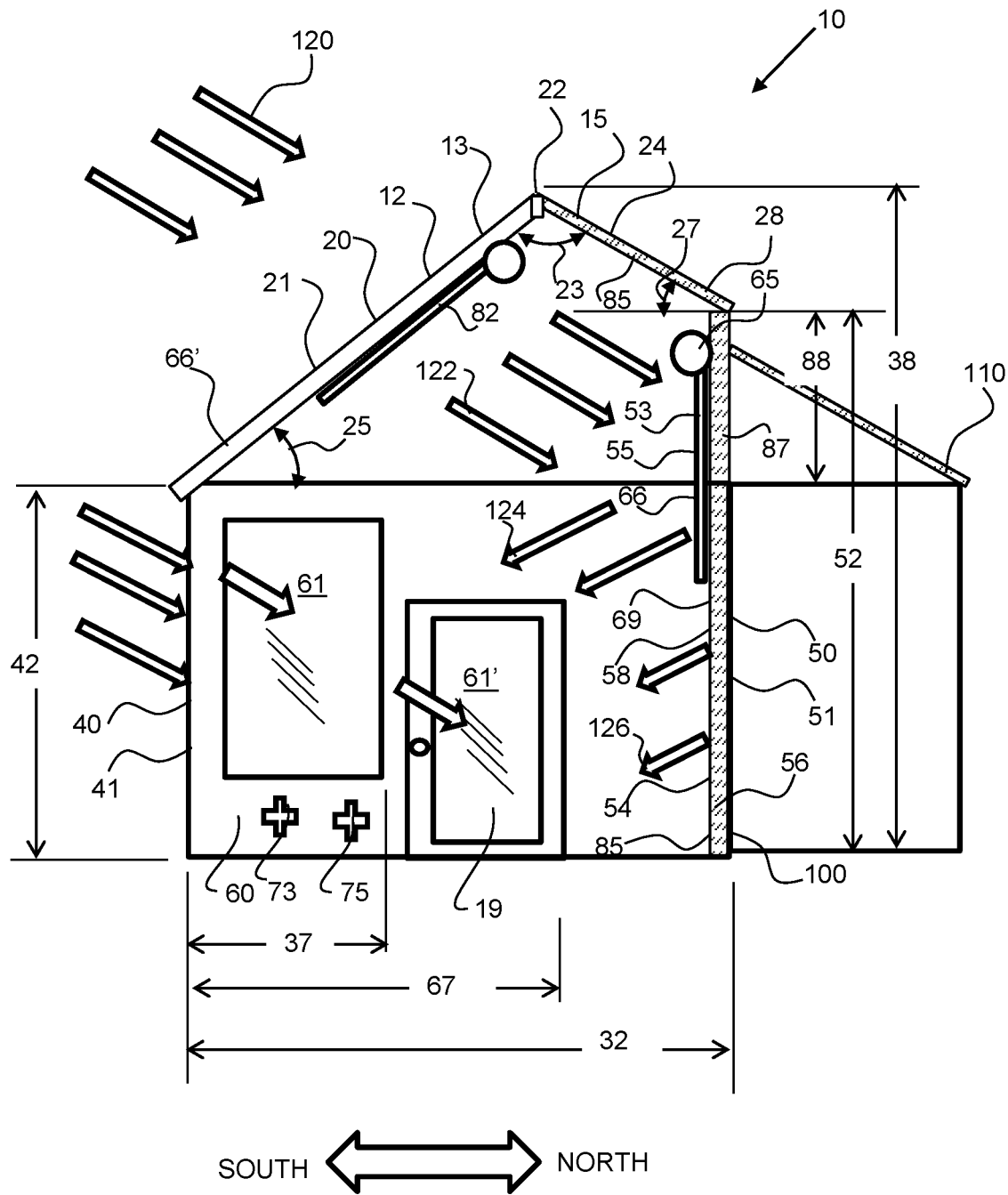
FIG. 4 shows an east wall view of an exemplary greenhouse having an extended height north wall.

As shown in FIGS. 2 to 4, an exemplary greenhouse 10 has an offset gable roof 15. The greenhouse enclosure 13 has a south wall height 42 and gable height 38, or height to the gable 22 of the roof 12. The enclosure has a width or depth 32 from the south wall 40 to the north wall 50. The east wall 60 has an east wall window 61 and a door 19. The door has a window 61'. The windows on the east wall extend to an east wall window depth 67, or the distance from the south wall 40 to the furthest window on the east wall. The east wall window 61 has a depth 37 from the south wall 40. The south rise angle 25, or the angle from the top of the south wall to the south extension 20 is shown. The north rise angle 27, or the angle from the top of the north wall 50 to the north extension 24 is shown. The gable angle 23, or the angle from the south extension 20 to the north extension of the roof is shown. As shown in FIGS. 2 and 3, the south rise angle is less than the north rise angle as the height of the north and south walls are substantially the same. The height of the north wall 52 in FIG. 4 is greater than the height of the south wall 42.

The north wall 50 has insulation 56 to prevent heat loss from the greenhouse, such as at night. In addition, the north extension 24 has insulation 28 to prevent heat loss. The sunlight or natural light 120 enters through the south extension windows 21 and is interior light 122 within the greenhouse. This interior light is incident on the inside surface 54 of the north wall 50 which has a reflective surface 58 and reflects off as reflected light 124. Reflected light 124 reflects off the inside surface of the north wall to provide multidirectional sunlight within the interior of the greenhouse. Note that the interior light or reflected light may be power light 126, as described herein. As described herein, this is beneficial for plant growth. Sunlight or natural light 120 also pass through the south wall windows 41 as well as the east wall windows 61, 61'. A door 19 may be configured on the east and/or on the west wall, or any of the other wall for additional light transmission. As shown in FIG. 2, an odor reducing material 86 is configured on the inside surface of the greenhouse to reduce smells associated with some plants, such as volatile organic compounds. The odor reducing material may be titanium dioxide that acts as a photocatalyst to react and destroy VOC's in the presence of heat or light.

As shown in FIG. 3, a sheet reflective sheet 55 extends down a reflective depth 57 from a sheet actuator 53, a take-up/unwind roller. The reflective sheet may be rolled up in a spool 65. The reflective sheet extends down along the north wall from the top or proximal the top of the north wall. As the requirements change, the reflective sheet may be actuated to provide a larger reflective area, or have a greater reflective depth, such as when the temperatures are cooler. The reflective area of the reflective sheet is the product of the reflective sheet depth and width of the reflective sheet, which may be about the width of the north wall. Alternatively, when the temperature of the greenhouse rises, a reflective sheet may be indexed up to reduce the reflective depth. The inside surface 54 of the north wall may be a reflective surface 58 that comprises a reflective material that may have different reflective properties from that of the reflective sheet, or may be less reflective, or light absorbing surface. In an exemplary embodiment, the reflective sheet reflects some light and allows a portion of the incident light to pass therethrough. An exemplary reflective sheet comprises a diffuse reflective material or surface that creates a diffuse reflective light, to increase the amount of light incident on plants within the greenhouse. Also, an exemplary reflective surface or reflective sheet may be a Power Light reflector 66, that produces power light, or light conducive for absorption by plants. The inside surface of the north wall may comprise a light absorbing surface 69 and the amount of reflectance may be controlled by the amount of the reflective sheet that is exposed by the actuator. The control of the actuator may be automatic and may be a function of the temperature in the greenhouse as measured by a temperature sensor 73 or the light intensity within the greenhouse as measured by a light sensor 75, and these sensors that relay the information to a controller 74 or to the actuator. The north wall may have one or more north wall windows 51.

As shown in FIG. 3, a phase change material 100 may be configured with the north wall and may absorb heat during daylight hours and then emit heat at night as the material changes phases due to temperature drop. The phase change material may absorb heat from direct light exposure, from the interior of the green house and from light or heat passing through a reflective sheet.

The interior of the greenhouse may comprise an odor reducing compound 85, such as TiO2, that will react with VOCs to reduce odor. The odor reducing compound may be configured along the north wall, the south, east and/or west walls, or along the inside surface of the north extension, and/or south extension. It may be preferred to have the odor reducing compound in an area where it will have direct light exposure and it may be configured on a reflective sheet or sheet that is configured, in some cases, to be actuated along the north wall. The wavelength of light may be about 380 nm for reacting the VOCs in the presence of the odor reducing compound.

As shown in FIG. 4, the height 52 of the north wall 50 is greater than the height 42 of the south wall 40 by an extension 87 having an extended height 88. This north wall extension provides a greater area for reflectance of light from the interior of the north wall and a greater area for phase change material. Also shown in FIG. 4 is a headhouse 110 coupled to the north wall. As described herein, a headhouse may provide additional thermal insulation along the north wall.

As shown in FIG. 2 to 4, an actuating insulation 82 is configured along the inside of the south extension and is shown rolled up or retracted in FIGS. 2 and 3 and deployed or actuated out from the actuator in FIG. 4. As described herein, the actuation insulation may comprise pleats or corrugations that enable the insulation material to fold and lay flat when retracted and that may open to increase the thickness of the actuating insulation when deployed, as shown in FIG. 22. As shown in FIG. 22, the actuating insulation 82 has a much greater thickness in a deployed state, as shown on the right side than in the retracted or stored state, as shown on the left side. The pleats 83 fold down over each other in the retracted state.

Figure 5:
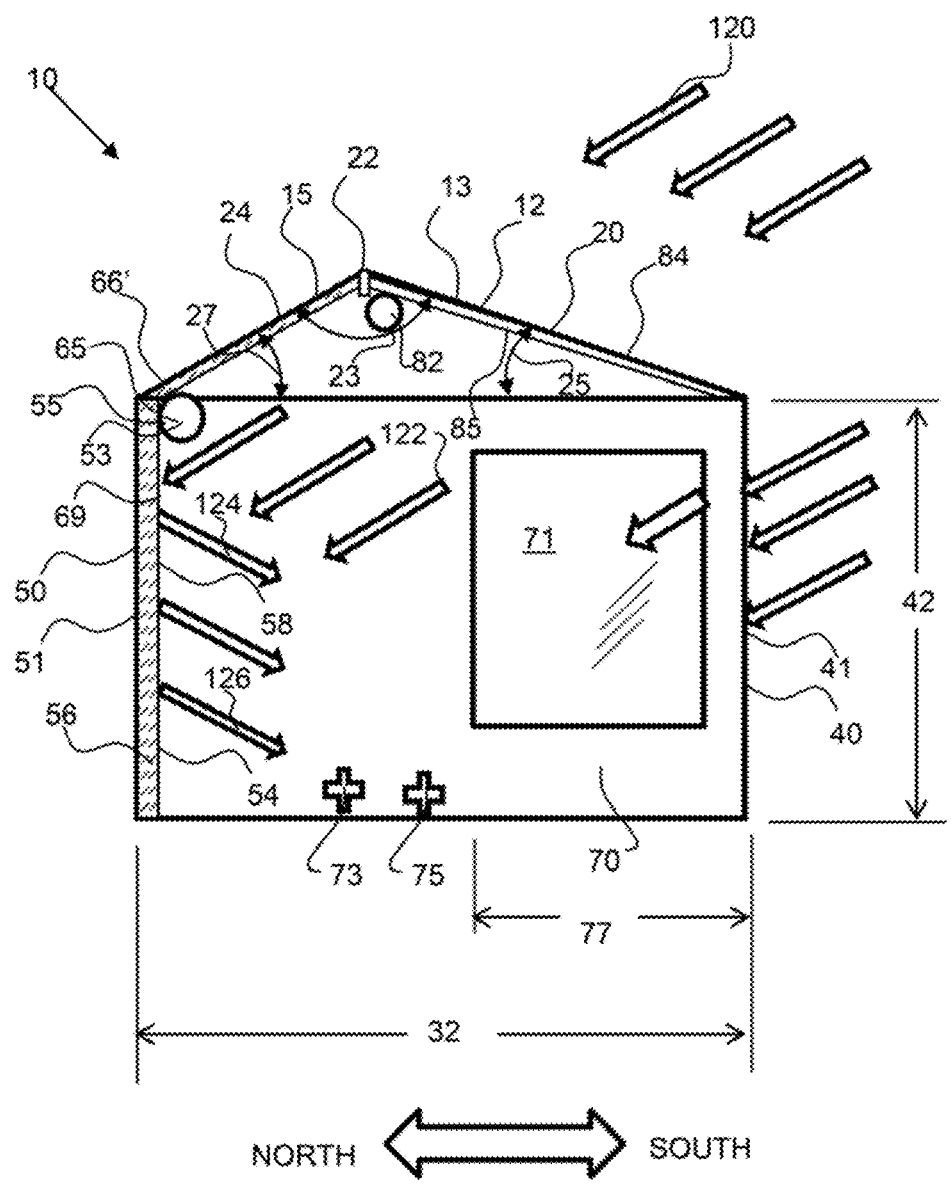
FIG. 5 shows a west wall view of an exemplary greenhouse having an offset gable roof.

As shown in FIG. 5, an exemplary greenhouse 10 has an offset gable roof 15. The west wall 70 has a west wall window 71 that allows sunlight to pass Into the interior of the greenhouse. The west wall has a west wall window depth 77 that is the distance from the south wall 40 to the edges of the furthermost west wall window 71 from the south wall.

Figure 6:
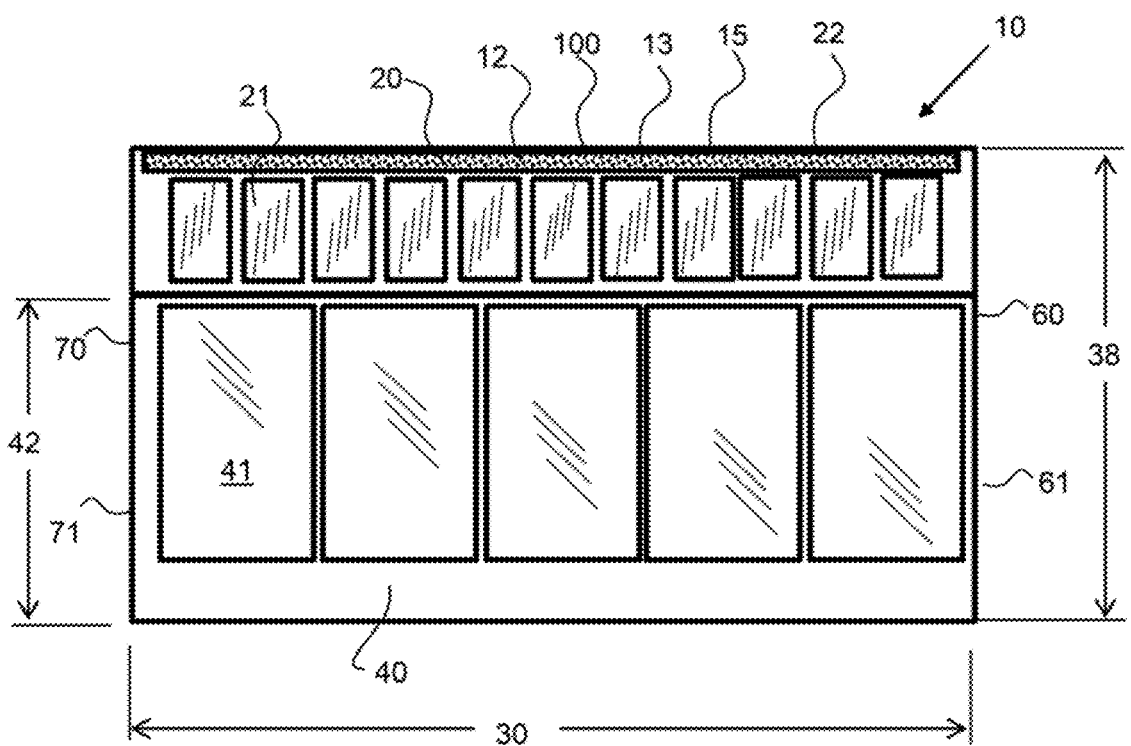
FIG. 6 shows a south wall view of an exemplary greenhouse having an offset gable roof.

As shown in FIG. 6, an exemplary greenhouse 10 has a south wall 40 having a plurality of south wall windows 41. The surface area of the south wall is predominantly windows, wherein more than 50% of the south wall surface area is made up of windows. The greenhouse enclosure 13 has a length 30 from the east wall 60 to the west wall 70. The length 30 may be the length of the gable. The south extension 20 has a plurality of south extension windows 21 that make up the majority of the surface area of the south extension. The south extension windows may be configured more proximal to the south wall than the gable, leaving a gap that may be used for a phase change material 100, as this elevated position will have a larger temperature change throughout the day and night. The portion of the south extension from the south extension windows to the gable may be insulated to prevent heat loss.

Figure 7:
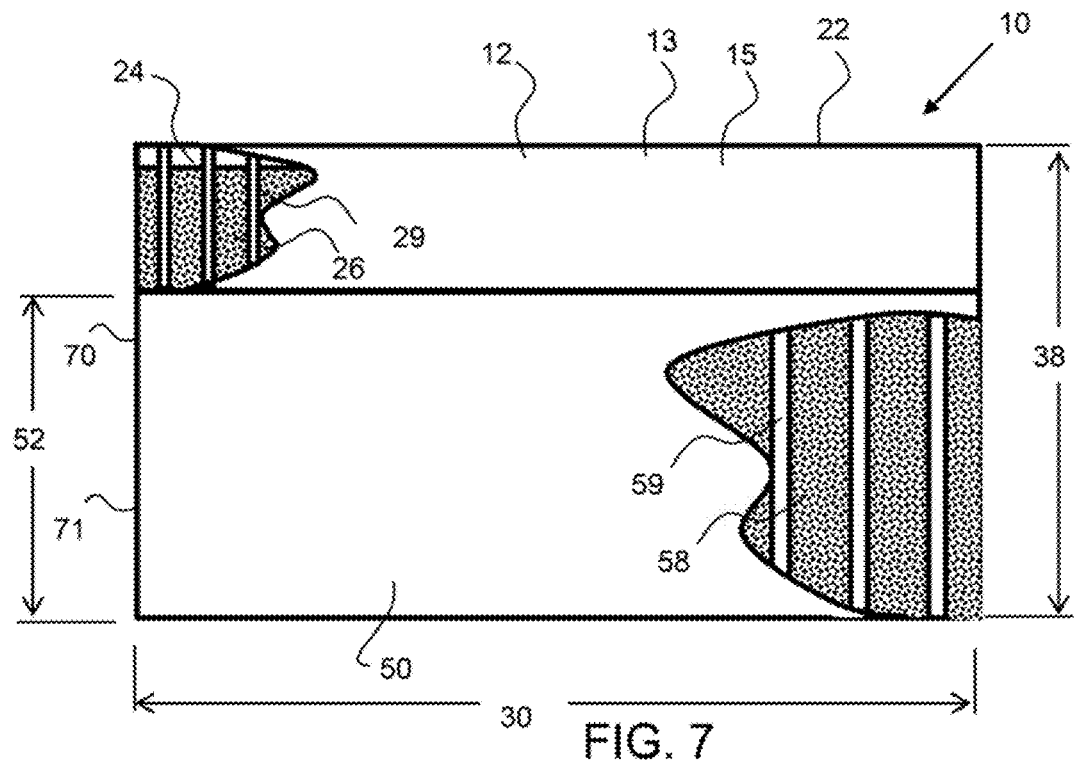
FIG. 7 shows a north wall view of an exemplary greenhouse having an offset gable roof.

As shown in FIG. 7, an exemplary greenhouse 10 has a north wall 50 with no windows. The north wall may be insulated having insulation 58 to prevent heat loss. The north wall comprises wall supports 59, such as studs to provide structural support and weight bearing of the roof. The north extension 24 may also have no windows and may comprise insulation 26 and roof supports 29, such as rafters that extend from the top of the north wall to the gable 24. The north wall has a height 52 and a length 30. As described herein, a headhouse may be configured along at least a portion of the north wall.

Figure 8:
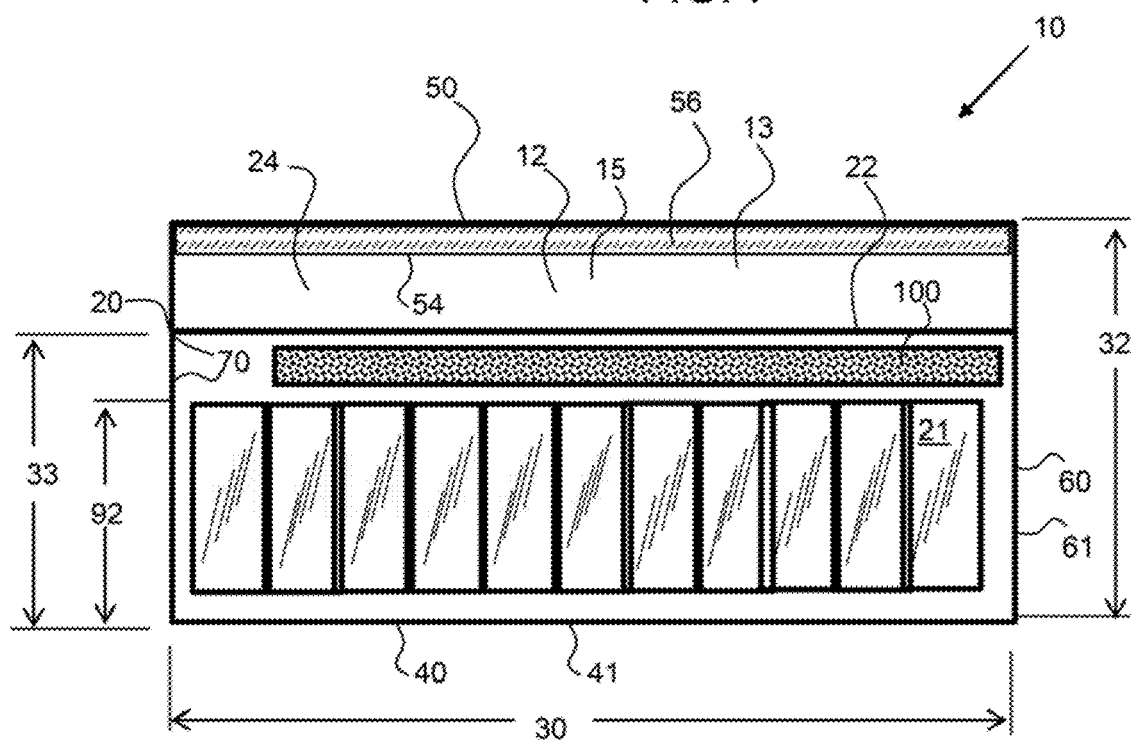
FIG. 8 shows a top view of an exemplary greenhouse having an offset gable roof.

As shown in FIG. 8, an exemplary greenhouse 10 has an offset gable roof 15, wherein the gable depth 33, or distance from the south wall 40 to the gable 22, is greater than the distance from the north wall 50 to the gable. The south extension 20 has a south extension window depth 92 that is a distance from the south wall to the furthermost south extension window 21 from the south wall. As described herein, the south extension windows may be configured more proximal to the south wall than to the gable for improved light transmission into the greenhouse enclosure 13 and for insulation of the top portion of the greenhouse. A phase change material may be configured in the gap between the south extension windows and the gable and may be configured on the north extension. The south extension area may be substantially south extension windows, wherein at least 75% of the area is windows, or at least 85% or 95% of the area is windows.

Figure 9:
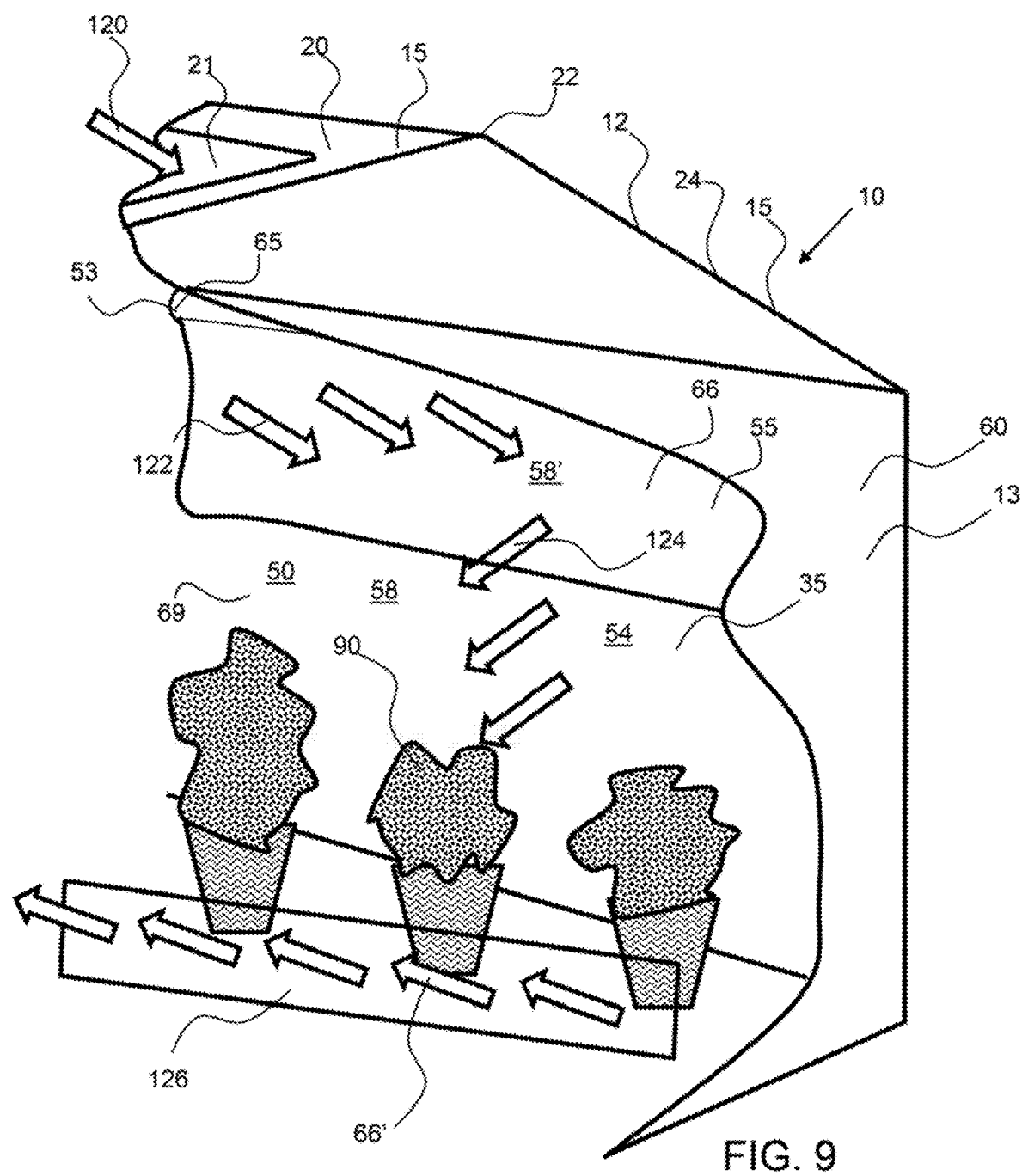
FIG. 9 shows a perspective cut-away view of an exemplary greenhouse having an offset gable roof and a reflective surface on the north wall to reflect the sun.

As shown in FIG. 9, an exemplary greenhouse 10 has an offset gable roof 15 and a reflective surface 58 on the north wall 50, or inside surface 54 to reflect that the interior light 122 that passes through the south extension windows 21. The reflected light 124 from the inside surface 54 of the north wall 50 provides diffuse reflected light to the plants 90, configured in the greenhouse. The unique geometry of the greenhouse described herein, provides reflected light 124, that may be multi-directional or diffuse reflected light to plants located in any location in the interior of the greenhouse, such as proximal the south wall and proximal the north wall. A reflective sheet 55 is shown extending down a portion of the depth of the north wall and may comprise a reflective surface 58' and/or a Power Light reflector 66. A Power Light reflector 66' is configured as a panel or sheet within the greenhouse and along a row of plants 90. This Power Light reflector will receive light reflected from the plants and from the rest of the greenhouse and transmit Power light 126.

Figure 10:
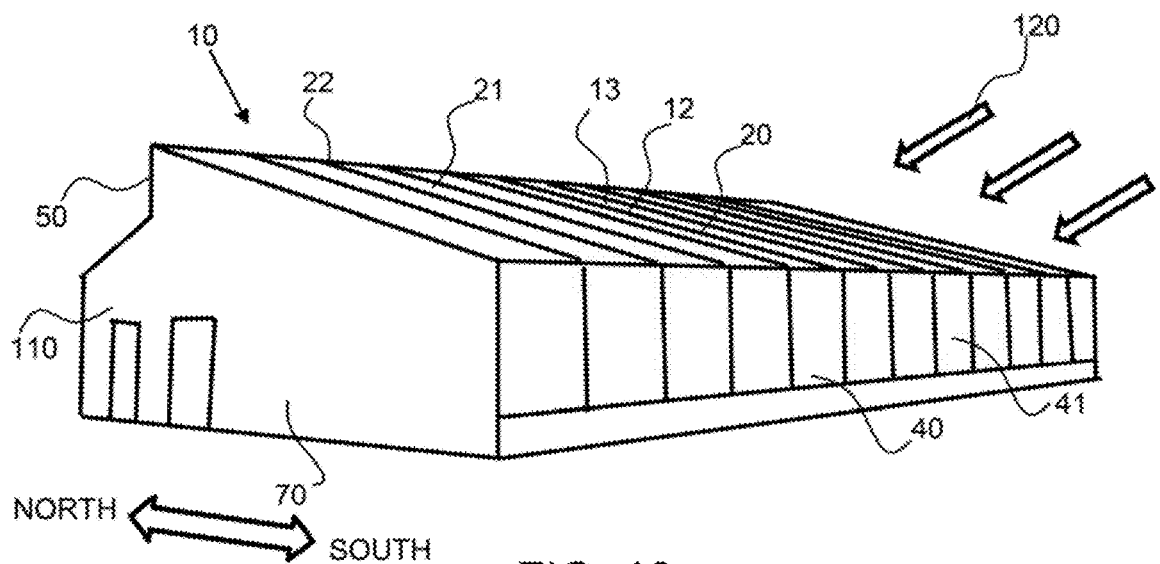
FIG. 10 shows the general shape and design of the exemplary greenhouse described in Example 1.

FIG. 10 shows the general shape and design of the exemplary greenhouse 10 described in Example 1. The greenhouse is configured with the south wall 40 facing south and the south extension 20 having south extension windows 21 extending from the south wall to the gable 22. The south extension consists essentially of windows, wherein the south extension surface area is at least 90% window and comprises windows and supports that are no more than about 10% of the width of the window, or preferably no more than about 5% of the width of the window, measured from east to west, as shown. A headhouse 110 is located along the north wall. The depth of the greenhouse is about 12.8 m (42 ft) and the length along the south wall is 22 m (72 ft). The ratio of length to depth is almost two. The north wall height is 6.1 m (20 ft) and the south wall height is 3.05 m (10 ft). The headhouse has a width of 3.05 m (10 ft) and a length of 22 m (72 ft). The headhouse does not have to have the same length as the greenhouse.

Figure 11:
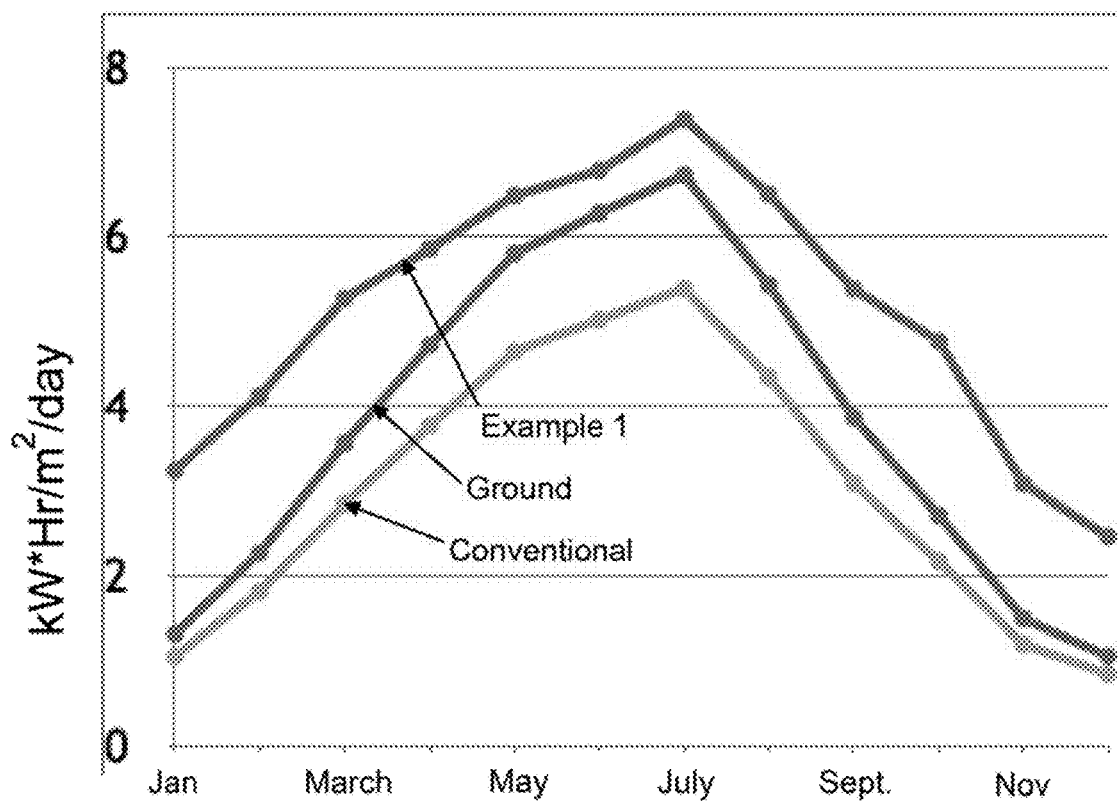
FIG. 11 shows the light intensity in the greenhouse of Example 1, compared to the light intensity on the ground and in a conventional greenhouse as a function of the month of the year.
Figure 13:
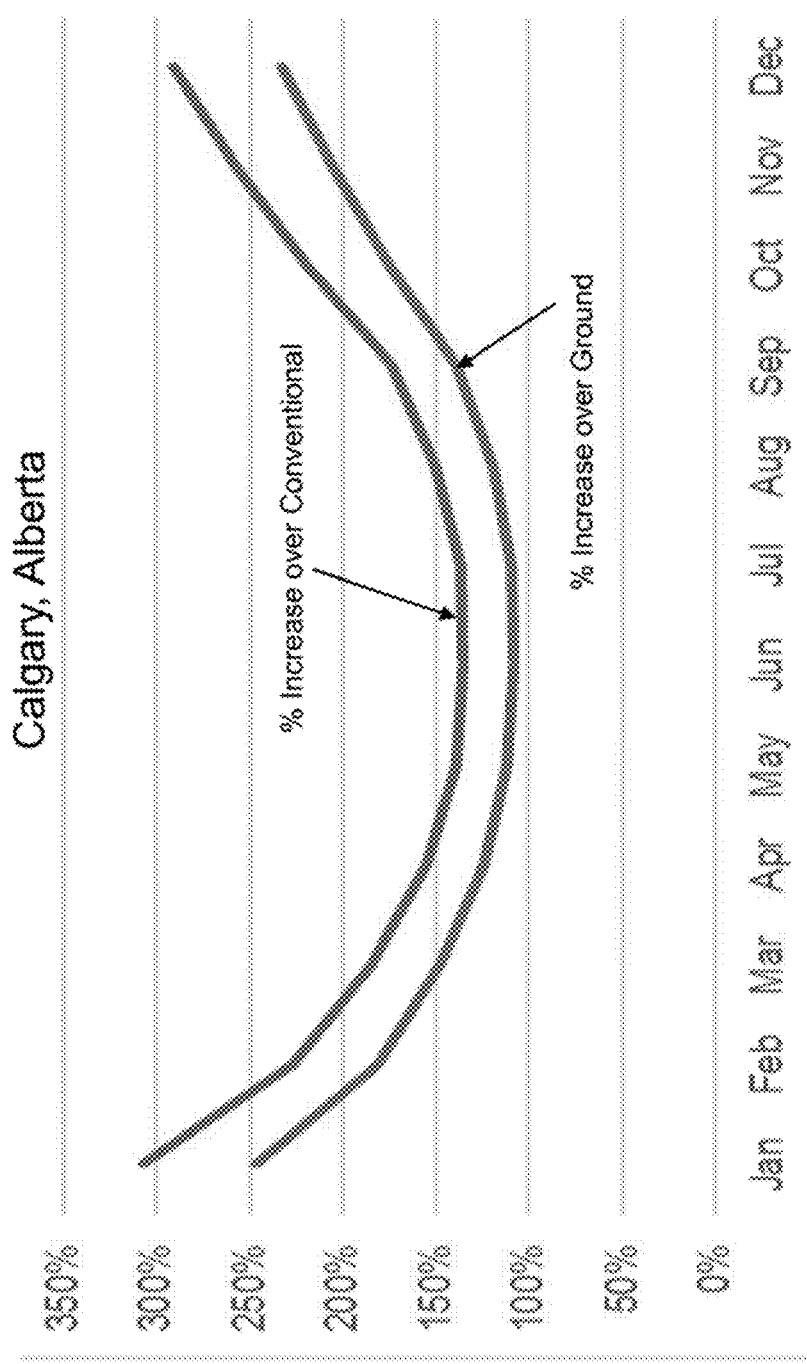
FIG. 13 shows a graph of the data from data in FIG. 12, showing the percentage increase in the light intensity of the greenhouse of Example 1 with the ground and a conventional greenhouse.
Figure 15:
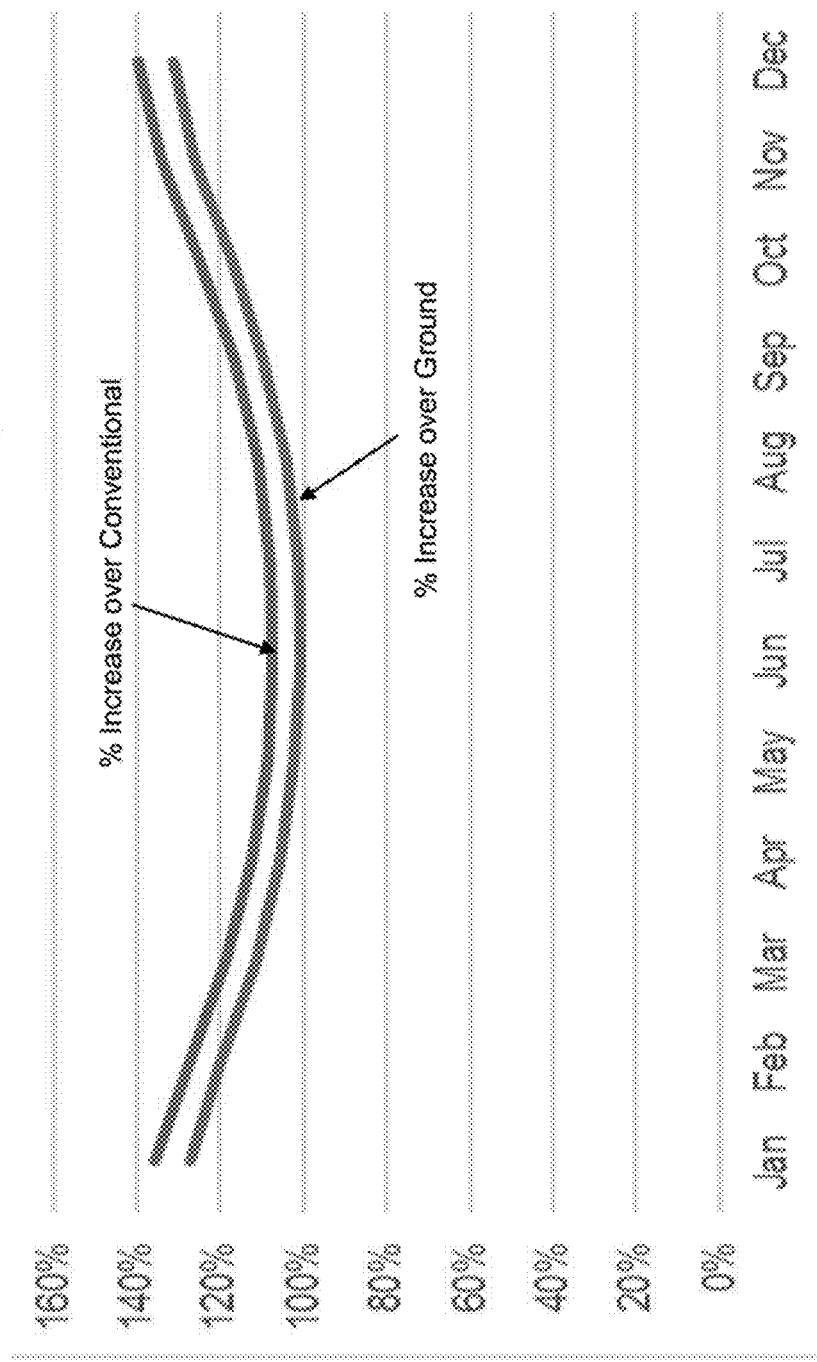
FIG. 15 shows a graph of the data from data in FIG. 12, showing the percentage increase in the light intensity of the greenhouse of Example 1 with the ground and a conventional greenhouse.

FIG. 11 shows the light intensity in the greenhouse of Example 1, compared to the light intensity on the ground and in a conventional greenhouse as a function of the month of the year in Calgary, Alberta, Canada. As shown the greenhouse of Example 1 produces a much higher light intensity than what is incident on the ground or within a conventional greenhouse, such as described in the Comparative Example. Both the Example 1 and conventional greenhouse have similar dimensions: length 30 m (100 ft), width 7 m (23 ft) and height 4.9 m (16 ft). In this case, the Example 1 is a single slope greenhouse with the highest point at the north wall FIG. 12 shows a table of data comparing the light intensity of the exemplary greenhouse of Example 1, to the light intensity on the ground and in a conventional greenhouse as a function of the month of the year and located in Calgary, Alberta, Canada. The production difference percentages for the greenhouse of Example 1 are very high, as shown in FIG. 13. As shown in Table 2, the production difference over a conventional greenhouse, as detailed in the Comparative Example, is about 200% over the entire year and about 250% over the winter months. This is a dramatic improvement in light intensity and therefore production. In this calculation we assume the same light transmission material for both greenhouses (80%). There is no light absorption for the outdoor light since it is not covered by glazing materials.

TABLE 2

|  | Production Difference between ground and Example 1 Greenhouse | Production Difference between Example 1 and conventional greenhouse |
| --- | --- | --- |
| AVG | 159% | 198% |
| AVG Winter Months (October-March) | 198% | 248% |

FIG. 14 shows a table of data comparing the light intensity of the exemplary greenhouse of Example 1, to the light intensity on the ground and in a conventional greenhouse as a function of the month of the year and located in Boulder, Colo. The production difference percentages for the greenhouse of Example 1 are very high, as shown in FIG. 14. As shown in Table 3 the production difference over a conventional greenhouse, as detailed in the Comparative Example, is 120% over the entire year and 130% over the winter months. This is a dramatic improvement in light intensity especially in the winter months in which any Improvement in light Increases production by equal amounts.

TABLE 3

|  | Production Difference between ground and Example 1 Greenhouse | Production Difference between Example 1 and conventional greenhouse |
| --- | --- | --- |
| AVG | 113% | 120% |
| AVG Winter Months (October-March) | 122% | 130% |

Figure 16:
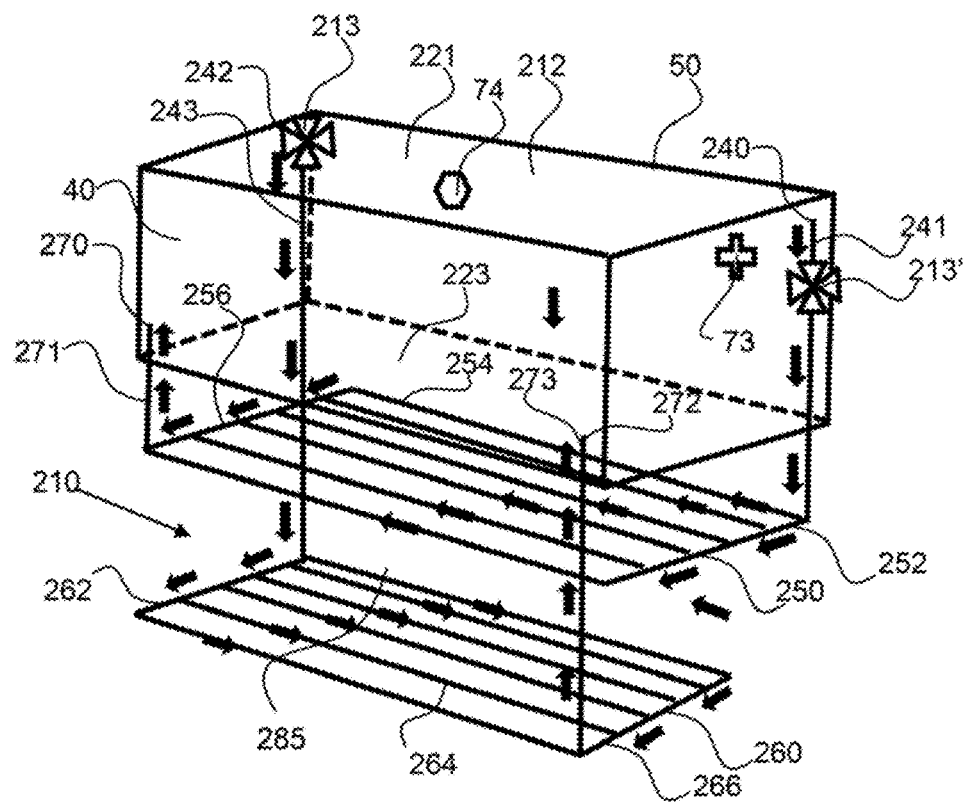
FIG. 16 shows an exemplary GAHT system having an upper manifold and lower manifold that extend under the greenhouse to control the temperature within the greenhouse.
Figure 17:
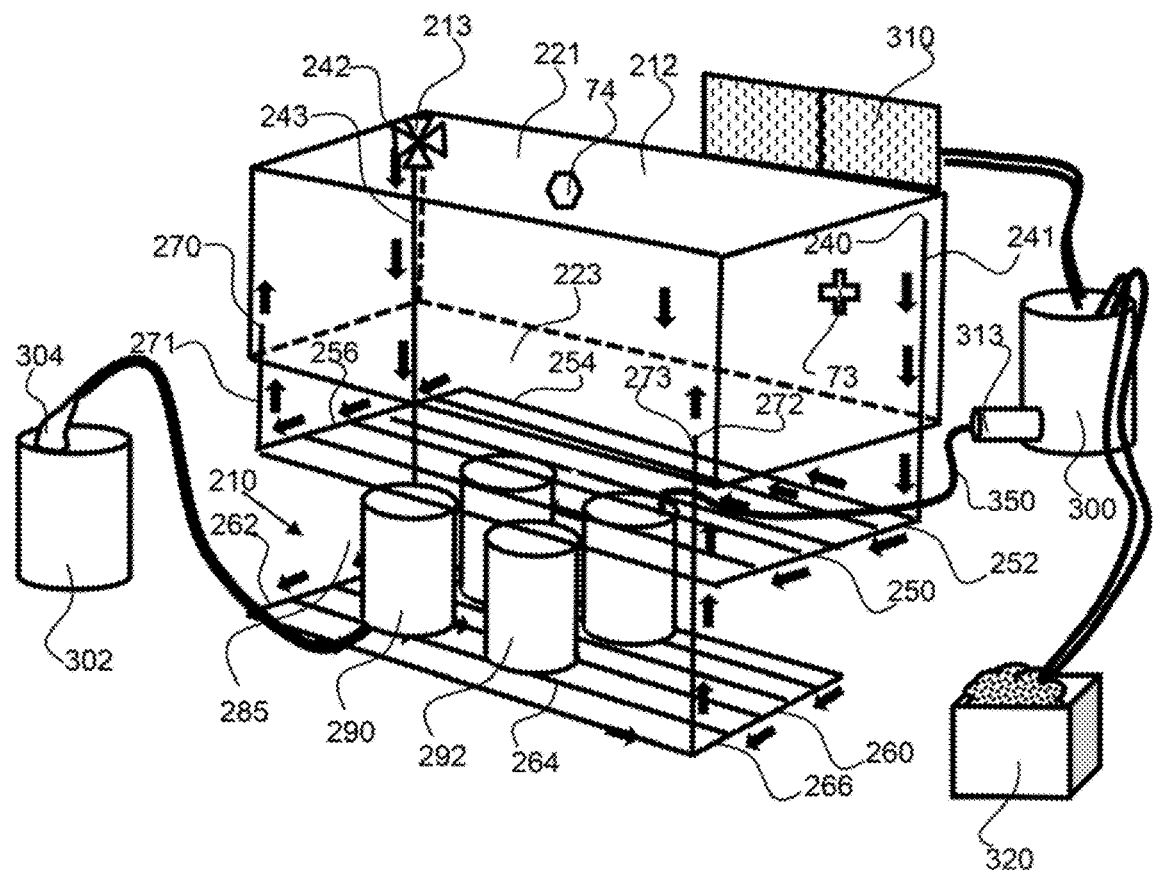
FIG. 17 shows an exemplary GAHT system with thermal reservoirs configured between and upper and lower manifold.

It is to be understood that the GAHT system may be configured with any of the greenhouses shown in FIGS. 1 to 10. The GAHT system is shown separately for ease of illustration only. As shown in FIGS. 16 and 17, an exemplary GAHT system 210 has an upper manifold 250 and a lower manifold 260 that extend under the greenhouse to control the temperature within the greenhouse. The upper manifold comprises a series of extension conduits 254 that extend under the floor 223 of the greenhouse 212. The upper manifold is connected with an inlet conduit 241 having an inlet 240 for drawing air in from the interior of the greenhouse enclosure 220. The inlet 240 may be configured proximal to the top or ceiling 221 of the greenhouse, wherein the air may be warmer than air more proximal to the floor 223 of the greenhouse. The inlet conduit may extend to the inlet transverse conduit 252, having the extension conduits 254 extending therefrom. The extension conduits 254 extend under the floor to the outlet transverse conduit 256 which is coupled with the outlet conduit 271 having an outlet 270 within the interior of the greenhouse and more proximal to the floor than the inlet 240. An exemplary GAHT system may also have a lower manifold 260 that extends under the greenhouse a greater depth from the floor of the greenhouse than the upper manifold. The lower manifold may extend a depth from the floor wherein the temperature of the soil is more consistent than the upper manifold. The lower manifold may be used to cool the greenhouse when the temperature approaches an upper threshold limit. The lower manifold comprises a series of extension conduits 264 that extend under the greenhouse floor 223. The lower manifold is connected with an inlet conduit 243 having an inlet 242 for drawing air in from the interior of the greenhouse 212 enclosure 220. The inlet 242 may be configured proximal to the top or ceiling 221 of the greenhouse, wherein the air may be warmer than air more proximal to the floor 223 of the greenhouse. The inlet conduit 243 extends to the inlet transverse conduit 262, having the extension conduits extending therefrom. The extension conduits 264 extend under the greenhouse to the transverse conduit 266 which is coupled with the outlet conduit 273 having an outlet 272 within the interior of the greenhouse and more proximal to the floor than the inlet 240. The exemplary GAHT system may be used to control the temperature within the greenhouse, by pumping air from the greenhouse through one or more of the upper and lower manifold. The manifolds are in thermal communication with the heat reservoir 285 and exchange heat with the heat reservoir to change the temperature of the greenhouse air flow as it moves through the GAHT system. An air moving device 213, 213' such as a fan or pump may be coupled with an inlet 242, 240, or outlet 270, 272 to move air through the GAHT system. A controller 74 may turn on the GAHT system when the temperature, as measured by a temperature sensor 73 indicates that the temperature has reached an upper or lower threshold limit. For example, when the temperature approaches an upper threshold limit during daylight hours, the lower manifold may be used to reduce the temperature within the greenhouse by pumping air from an inlet 270, proximal to the ceiling of the greenhouse, through the lower manifold, and out an outlet more proximal to the floor of the greenhouse than said inlet.

As shown in FIG. 17, an exemplary GAHT system 210 comprises thermal reservoirs 290 configured between and upper manifold 250 and the lower manifold 260. The thermal reservoirs may be water reservoirs 292, such as barrels. The thermal reservoirs 290 may be connected with a thermal medium inlet reservoir 300 and a thermal medium outlet reservoir 302. A thermal medium pump 313 may move the thermal medium to the thermal medium conduit 350 and may be a pump, fan or any other device for moving a fluid through a conduit. The thermal medium conduit 350 may be in thermal communication with the heat reservoir 285, such as the soil in and around the GAHT manifold or may be coupled with any of the conduits of the GAHT system. Valves may open and dose coupling with the GAHT conduit to allow a flow of thermal medium therein or therearound. A thermal medium conduit may have apertures to allow a release of thermal medium into the heat reservoir, such as into the soil or thermal mass configured around the GAHT conduits. A thermal medium, or hydronic fluid, such as water, glycol or a solution containing glycol, may be pumped into the thermal reservoirs from the thermal medium inlet reservoir 300 and out of the thermal reservoirs to the thermal medium outlet reservoir 302 to control the temperature within the greenhouse. The thermal medium inlet reservoir may be temperature controlled, such as by being heated above ambient temperatures or cooled below ambient temperatures, to control the temperature inside of the greenhouse. For example, on hot days the greenhouse may approach an upper threshold temperature and cool water from the thermal medium inlet reservoir 300 may be pumped into the thermal reservoirs 290 to reduce the temperature within the greenhouse, wherein the GAHT system 210 provides cooling air as it is circulated through the upper and/or lower manifolds. A thermal medium may be heated by a hot water heater, or by flowing it through a photovoltaic panel 310 to draw heat from the photovoltaic panel, or by flowing it through compost 320 which generates heat as the part of the degradation process. Note that the flow of thermal medium to and from the GAHT may flow direct from the heating sources, such as the compost or photovoltaic panels or may flow to a thermal medium reservoir 300 and then to the GAHT as shown. A thermal medium may be air, such as from the exterior of the greenhouse or interior of the greenhouse, and may be heated or cooled by flowing through a thermal exchange device.

Figure 18:
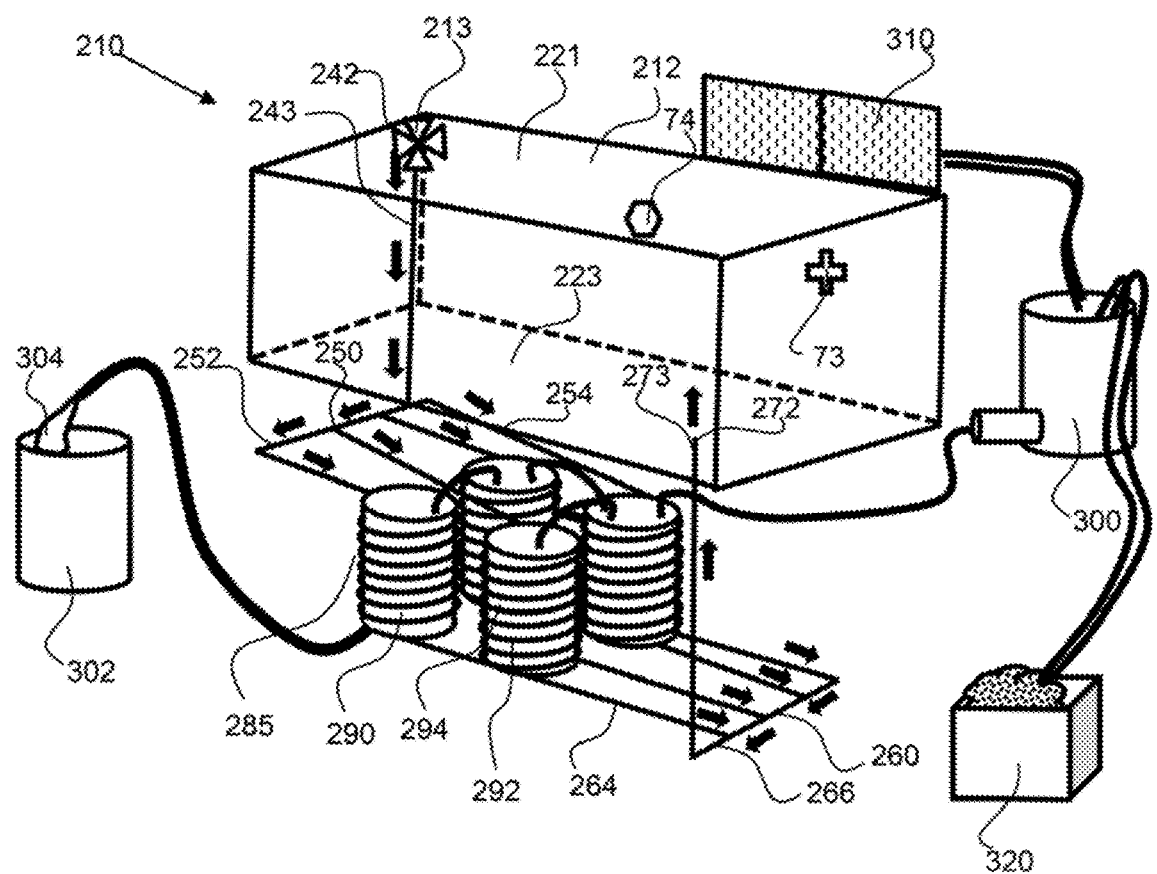
FIG. 18 shows an exemplary GAHT system with GAHT conduits extending around the thermal reservoirs for heat exchange through conduction with the thermal reservoirs, and a thermal medium inlet reservoir and a thermal medium outlet reservoir.

As shown in FIG. 18, an exemplary GAHT system 210 comprises GAHT conduits 294 extending around the thermal reservoirs 290 for heat exchange through conduction with the thermal reservoirs. As shown, four water reservoirs 292 have GAHT conduits that spiral around the barrels to provide conduction with the thermal reservoirs. Also, a thermal medium inlet reservoir 300 and thermal medium outlet reservoir 302 are coupled with the thermal medium reservoirs to provide a flow of thermal medium, such as water from the thermal medium inlet reservoir 300 to the thermal medium outlet reservoir 302. This arrangement provides an inlet and outlet flow of thermal medium 304 to and from the thermal reservoirs. The thermal medium inlet reservoir 300 and/or the thermal medium outlet reservoir 302 may be configured inside or outside of the greenhouse. Also, the thermal reservoirs may be configured in close proximity to or in contact with floor 223 of the greenhouse.

Figure 19:
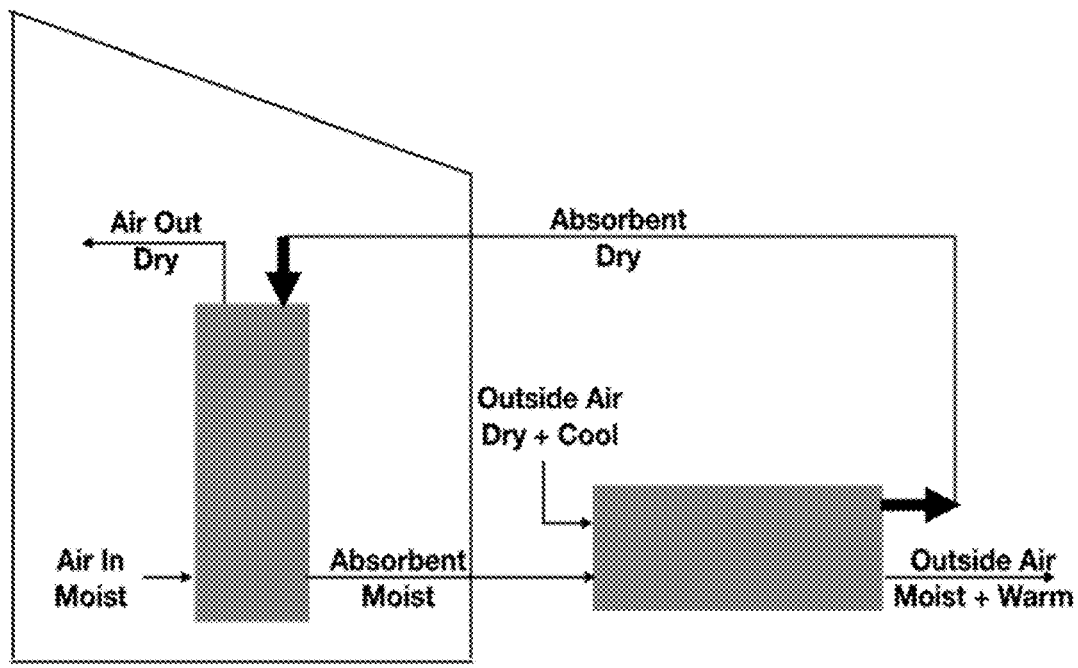
FIG. 19 shows a diagram of the airflow from a GAHT system into a greenhouse.

FIG. 19 shows a diagram of a solar dehumidification system using liquid absorbents. Humid air inside the greenhouse is dried in a vertical counter flow absorber. The dried air is released into the greenhouse. The liquid is pumped outside of the greenhouse into an horizontal solar heater. Once the liquid is heated above 60 C (140F) the liquid releases the water to the outside air. The dried liquid is pumped back to the greenhouse.

FIG. 20 shows a table of the energy usage of an exemplary greenhouse located in Leadville. Colo., at an altitude of 3200 m (10500 ft) (see FIG. 10). The electricity use for this greenhouse is relatively high because grow lights (Gavita Brand 1000 W) are used to increase production in this greenhouse between 4 to 6 hrs/day. The energy use for the operation of the GAHT fans is less than 1000/mo. The average nighttime temperature in Leadville in the winter months is −15 C. The GAHT system is the main source of heating in this greenhouse.

FIG. 21 show a table comparing the energy usage of an exemplary greenhouse and a standard commercial building. Both buildings energy usage has been calculated using the Sefaira energy calculation software. We are comparing a standard commercial building with the greenhouse because the municipality would not allow construction of the greenhouse unless it had a similar energy use to a standard commercial building. The Sefaira software did not allow the inclusion of the GAHT system into the model. The actual energy usage of the greenhouse as seen in FIG. 20 is very close to the predicted usage.

Example 1

An exemplary greenhouse of the present invention as generally shown in FIG. 10, having a length along the south wall of about 30 m (100 ft) and a width of about 10 m (30 ft) was used for light modeling as detailed in FIGS. 12 to 15. For the model, the north and south walls were 2.4 m (8 ft) tall and the gable was 4.3 m (14 ft) and offset. The south extension portion of the roof was about 7.2 m (23.5 ft) long and the north extension portion of the roof was about 2.1 m (7 ft). The gable was offset much closer to the north wall than the south wall. The bottom 0.6 m (2 ft) of the south was insulated and the remainder of the south wall as well as the entire south extension was windows, having a 2.5 R value. The east wall, west wall and north wall were closed and insulated for the model. All areas that were insulated had a 21R value, for the model.

For modeling and calculations as detailed in FIGS. 20, and 21, the air infiltration in Example 1 was 0.5/hour which means half of the inside volume of the greenhouse was exchanged with outside air per hour. Also, the GAHT system and phase change material system was used in the model to provide a reduction in power consumption by 75%. In most greenhouses similar to Example 1 the energy savings over conventional greenhouses in cold climates is 75% up to 95% and even 99%.

Comparative Example

A standard greenhouse having a length of 30 m (100 ft) and width of 10 m (30 ft) but oriented with a center gable extending east/west was used for the comparative model. The entire structure was windows having a 1.5R value. Also, for the models as detailed in FIGS. 20 and 21, the air infiltration was 3.0, or six times that of Example 1.

It will be apparent to those skilled in the art that various modifications, combinations and variations can be made in the present invention without departing from the spirit or scope of the invention. Specific embodiments, features and elements described herein may be modified, and/or combined in any suitable manner. Thus, it is Intended that the present invention cover the modifications, combinations and variations of this invention provided they come within the scope of the appended claims and their equivalents.

What is claimed is:

1. A greenhouse system comprising:
   a greenhouse comprising an enclosure comprising:
     a south wall comprising south wall windows;
     a north wall comprising an inside surface;
     a reflective surface configured along the inside surface of the north wall;
     an east wall;
     a west wall;
     a gable;
     a south extension comprising south extension windows;
     a greenhouse enclosure ceiling;
     a greenhouse enclosure floor;
   wherein the gable is offset and is configured closer to said north wall than to said south wall;
   a ground to air heat transfer system comprising:
     an inlet conduit that extends from an inlet opening within the greenhouse enclosure to a lower heat exchange manifold that is configured below the floor of the greenhouse; the inlet opening configured to receive an inlet flow of greenhouse gas;
     said lower heat exchange manifold comprising a plurality of extension conduits coupled with the inlet conduit and extending horizontally under the floor of the greenhouse;
     wherein the plurality of extension conduits includes at least five extension conduits;
     an outlet conduit coupled with the plurality of extension conduits and extending up to an outlet opening and into the greenhouse enclosure; wherein the outlet opening exhausts greenhouse gas that has flowed through the lower heat exchange manifold back into the greenhouse enclosure;
     an air moving device configured to produce a flow of greenhouse gas from the greenhouse enclosure, through the inlet opening of the inlet conduit, through the lower heat exchange manifold and back into the greenhouse enclosure through the outlet opening;
     a controller;
   wherein the air moving device is turned on by the controller when a greenhouse temperature exceeds an upper threshold temperature to produce a hot flow of greenhouse gas into the inlet opening that is cooled in the lower heat exchange manifold to produce a cooled flow of greenhouse gas through the outlet opening into the greenhouse;
   wherein the air moving device is turned on by the controller on when the greenhouse temperature drops below a lower threshold temperature to produce a cool flow of greenhouse gas into the inlet opening that is heated in the lower heat exchange manifold to produce a heated flow of greenhouse gas through the outlet opening into the greenhouse;
   a heat reservoir configured between the at least five extension conduits and the floor of the greenhouse, wherein said heat reservoir is in thermal communication with the lower heat exchange manifold, said heat reservoir configured to store heat from the hot flow of greenhouse gas and subsequently transfer the stored heat to the cool flow of greenhouse gas; thereby moderating the temperature of the greenhouse gas;
   wherein the lower heat exchange manifold comprises:
     an inlet traverse conduit coupled to the inlet conduit and having a plurality of extension openings;
     said plurality of extension conduits configured under the floor of the greenhouse enclosure and coupled with the extension openings of the inlet traverse conduit; and
     an outlet traverse conduit having a plurality of extension openings and coupled with the plurality of extension conduits; and
     wherein heat is exchanged between the flow of greenhouse gas in transfer and the heat reservoir and wherein the heat exchange takes place below the floor of the greenhouse enclosure;
   the greenhouse system comprising two heat exchange manifolds including an upper heat exchange manifold extending horizontally above said lower heat exchange manifold that extends horizontally a reservoir distance from the upper heat exchange manifold, said upper heat exchange manifold comprising:
     a) an inlet traverse conduit coupled to the inlet conduit and having a plurality of extension openings;
     b) a plurality of extension conduits coupled with the extension openings of the inlet traverse conduit;
     wherein the plurality of extension conduits includes at least five extension conduits;
     c) an outlet traverse conduit having a plurality of extension openings and coupled with the plurality of extension conduits;
   wherein the heat reservoir is configured between the upper heat exchange manifold and the lower heat exchange manifold.

2. The greenhouse system of claim 1, wherein the reservoir distance is at least 50 cm.

3. The greenhouse system of claim 1, wherein the heat reservoir comprises soil.

4. The greenhouse system of claim 1,
   wherein the upper heat exchange manifold is coupled with an upper inlet conduit that extends into the greenhouse enclosure and having an upper manifold inlet opening for receiving an upper manifold inlet flow of greenhouse gas and an upper manifold outlet conduit that extends from said upper heat exchange manifold into the greenhouse enclosure and having an upper manifold outlet opening to provide a flow of upper manifold outlet flow of greenhouse gas into the greenhouse enclosure; and
   wherein the lower heat exchange manifold is coupled with a lower manifold inlet conduit that extends into the greenhouse enclosure and having a lower manifold inlet opening for receiving a lower manifold inlet flow of greenhouse gas and a lower manifold outlet conduit that extends from said lower heat exchange manifold into the greenhouse enclosure and having a lower manifold outlet opening to provide a flow of lower manifold outlet flow of greenhouse gas into the greenhouse enclosure.

5. The greenhouse system of claim 1, wherein the inlet opening is configured more proximal to the ceiling of the greenhouse enclosure than the outlet opening.

6. The greenhouse system of claim 1, further comprising a thermal medium system comprising:
   a) a thermal medium conduit for receiving a flow of thermal medium from outside of the greenhouse enclosure;
   wherein the thermal medium conduit extends to the heat reservoir and transfers heat to the heat reservoir under the greenhouse.

7. The greenhouse system of claim 6, wherein the thermal medium is air.

8. The greenhouse system of claim 6, wherein the thermal medium comprises water.

9. The greenhouse system of claim 6, wherein the thermal medium is heated by conductive heat transfer with a solar panel.

10. The greenhouse system of claim 6, wherein the thermal medium is heated by heat transfer with compost.

11. The greenhouse system of claim 6, comprising a thermal reservoir for receiving the thermal medium from the thermal medium conduit, and wherein the thermal reservoir is in thermal communication with the heat exchange manifold.

12. A greenhouse system comprising a ground to air heat transfer system comprising:
   a) a greenhouse enclosure having a ceiling;
   b) a greenhouse enclosure floor;
   c) an inlet conduit that extends from an inlet opening within the greenhouse enclosure to a lower heat exchange manifold that is configured below the floor of the greenhouse; the inlet opening configured to receive an inlet flow of greenhouse gas;
   d) said lower heat exchange manifold comprising a plurality of extension conduits coupled with the inlet conduit and extending horizontally under the floor of the greenhouse;
      wherein the plurality of extension conduits includes at least five extension conduits;
   e) an outlet conduit coupled with the plurality of extension conduits and extending up to an outlet opening and into the greenhouse enclosure; wherein the outlet opening exhausts greenhouse gas that has flowed through the lower heat exchange manifold back into the greenhouse enclosure;
   f) an air moving device configured to produce a flow of greenhouse gas from the greenhouse enclosure, through the inlet opening of the inlet conduit, through the lower heat exchange manifold and back into the greenhouse enclosure through the outlet opening;
   g) a controller;
      wherein the air moving device is turned on by the controller when a greenhouse temperature exceeds an upper threshold temperature to produce a hot flow of greenhouse gas into the inlet opening that is cooled in the lower heat exchange manifold to produce a cooled flow of greenhouse gas through the outlet opening into the greenhouse;
      wherein the air moving device is turned on by the controller when the greenhouse temperature drops below a lower threshold temperature to produce a cool flow of greenhouse gas into the inlet opening that is heated in the lower heat exchange manifold to produce a heated flow of greenhouse gas through the outlet opening into the greenhouse;
   h) a heat reservoir configured between the at least five extension conduits and the floor of the greenhouse, wherein said heat reservoir is in thermal communication with the lower heat exchange manifold, said heat reservoir configured to store heat from the hot flow of greenhouse gas and subsequently transfer the stored heat to the cool flow of greenhouse gas; thereby moderating the temperature of the greenhouse gas;
      wherein the lower heat exchange manifold comprises:
      an inlet traverse conduit coupled to the inlet conduit and having a plurality of extension openings;
      said plurality of extension conduits configured below the floor of the greenhouse enclosure and coupled with the extension openings of the inlet traverse conduit; and
      an outlet traverse conduit having a plurality of extension openings and coupled with the plurality of extension conduits; and
      wherein heat is exchanged between the flow of greenhouse gas in the lower heat exchange manifold and the heat reservoir and wherein the heat exchange takes place below the floor of the greenhouse enclosure;
   the greenhouse system comprising two heat exchange manifolds including an upper heat exchange manifold extending horizontally above said lower heat exchange manifold that extends horizontally a reservoir distance from the upper heat exchange manifold, said upper heat exchange manifold comprising:
   a) an inlet traverse conduit coupled to the inlet conduit and having a plurality of extension openings;
   b) a plurality of extension conduits coupled with the extension openings of the inlet traverse conduit;
      wherein the plurality of extension conduits includes at least five extension conduits;
   c) an outlet traverse conduit having a plurality of extension openings and coupled with the plurality of extension conduits;
      wherein the heat reservoir is configured between the upper heat exchange manifold and the lower heat exchange manifold.

13. The greenhouse system of claim 12, wherein the heat reservoir comprises soil.

14. The greenhouse system of claim 12,
   wherein the upper heat exchange manifold is coupled with an upper inlet conduit that extends into the greenhouse enclosure and having an upper inlet opening for receiving an upper inlet flow of greenhouse gas and an upper outlet conduit that extends from said upper heat exchange manifold into the greenhouse enclosure and having an upper outlet opening to provide a flow of upper outlet flow of greenhouse gas into the greenhouse enclosure; and
   wherein the lower heat exchange manifold is coupled with a lower inlet conduit that extends into the greenhouse enclosure and having a lower inlet opening for receiving a lower inlet flow of greenhouse gas and a lower outlet conduit that extends from said lower heat exchange manifold into the greenhouse enclosure and having a lower outlet opening to provide a flow of lower outlet flow of greenhouse gas into the greenhouse enclosure.

15. The greenhouse system of claim 12, wherein the inlet opening is configured more proximal to the ceiling of the greenhouse enclosure than the outlet opening.

16. The greenhouse system of claim 12, further comprising a thermal medium system comprising:
a) a thermal medium conduit for receiving a flow of thermal medium from outside of the greenhouse enclosure;
wherein the thermal medium conduit extends to the heat reservoir and transfers heat to the heat reservoir.

17. The greenhouse system of claim 16, comprising a thermal medium pump to pump the thermal medium through the thermal medium conduit.

18. The greenhouse system of claim 16, wherein the thermal medium is air.

19. The greenhouse system of claim 16, wherein the thermal medium comprises water.

20. The greenhouse system of claim 16, wherein the thermal medium comprises glycol.

21. The greenhouse system of claim 16, wherein the thermal medium is heated by conductive heat transfer with a solar cell.

22. The greenhouse system of claim 16, wherein the thermal medium is heated by heat transfer with compost.

23. The greenhouse system of claim 16, comprising a thermal reservoir for receiving the thermal medium from the thermal medium conduit, and wherein the thermal reservoir is in thermal communication with the heat exchange manifold.

24. The greenhouse system of claim 23, wherein at least one of the heat exchange manifolds extends around the thermal reservoir to exchange heat with the thermal reservoir.

25. The greenhouse system of claim 23, wherein the thermal reservoir is an enclosure having an inlet and an outlet.

26. The greenhouse system of claim 25, wherein the thermal medium is heated by heat transfer with a photovoltaic cell.

27. The greenhouse system of claim 25, wherein the thermal medium is heated by heat transfer with compost.

28. The greenhouse system of claim 12, wherein the ground to air heat transfer system is pressurized to reduce radon gas buildup within the greenhouse enclosure.

* * * * *